US010990166B1

(12) United States Patent
Knull et al.

(10) Patent No.: US 10,990,166 B1
(45) Date of Patent: Apr. 27, 2021

(54) REMOTE REACTION CAPTURE AND ANALYSIS SYSTEM

(71) Applicant: Truthify, LLC, Kennesaw, GA (US)

(72) Inventors: Kevin Daniel Knull, Manakin-Sabot, VA (US); Curtis Robert Shoch, Kennesaw, GA (US); Justin Wisz, New York, NY (US)

(73) Assignee: TRUTHIFY, LLC, Kennesaw, GA (US)

( * ) Notice: Subject to any disclaimer, the term of this patent is extended or adjusted under 35 U.S.C. 154(b) by 0 days.

(21) Appl. No.: 16/936,708

(22) Filed: Jul. 23, 2020

Related U.S. Application Data

(60) Provisional application No. 63/022,567, filed on May 10, 2020.

(51) Int. Cl.
*G06F 3/01* (2006.01)
*G06K 9/00* (2006.01)
*G06F 3/0482* (2013.01)
*G06F 3/0488* (2013.01)

(52) U.S. Cl.
CPC .............. *G06F 3/011* (2013.01); *G06F 3/017* (2013.01); *G06F 3/0482* (2013.01); *G06F 3/04883* (2013.01); *G06K 9/00302* (2013.01); *G06F 2203/011* (2013.01)

(58) Field of Classification Search
CPC ..... G06K 9/00302; G06F 3/011; G06F 16/00; G06F 3/0484; G06F 2203/011; G06F 3/04883; G06F 3/0483; G06F 3/017; H04N 21/234336; G06Q 30/0203; H04M 1/72522; H04L 67/22
See application file for complete search history.

(56) References Cited

U.S. PATENT DOCUMENTS

| | | |
|---|---|---|
| 7,113,916 B1 | 9/2006 | Hill |
| 8,235,725 B1 | 8/2012 | Hill |
| 8,635,105 B2 | 1/2014 | Pradeep et al. |
| 9,106,958 B2 | 8/2015 | el Kaliouby et al. |
| 9,204,836 B2 | 12/2015 | Bender et al. |
| 9,503,786 B2 | 11/2016 | el Kaliouby et al. |
| 9,723,992 B2 | 8/2017 | Senechal et al. |
| 9,734,510 B1 | 8/2017 | Hill |

(Continued)

OTHER PUBLICATIONS

Affectiva, "Optimize Brand Content and Media Spend by Measuring Consumer Emotional Responses to Videos, Ads, and TV shows," accessed on Aug. 6, 2020, accessed at: https://www.affectiva.com/product/affdex-for-market-research, 10 pages.

(Continued)

*Primary Examiner* — Steven P Sax

(74) *Attorney, Agent, or Firm* — Smolinski Rosario Law P.C.

(57) ABSTRACT

Systems and methods are provided for informing a user about the emotional response of the user to a presentation. Facial expressions of the user are monitored while the user is presented with the presentation. The facial expressions are analyzed to determine an emotion displayed at one or more specific times of the presentation. The user is provided with information about the emotion conveyed by the facial expressions of the user. The user is further provided with an opportunity to take a selected action that corresponds to the emotion conveyed.

11 Claims, 28 Drawing Sheets

(56) References Cited

U.S. PATENT DOCUMENTS

| | | | |
|---|---|---|---|
| 9,781,218 B2* | 10/2017 | Lessin | H04L 67/22 |
| 10,111,611 B2 | 10/2018 | el Kaliouby et al. | |
| 10,187,690 B1* | 1/2019 | Garcia | H04N 21/44008 |
| 10,402,698 B1 | 9/2019 | Tse et al. | |
| 10,424,318 B2 | 9/2019 | Levy-Rosenthal | |
| 10,595,764 B2 | 3/2020 | Kubo | |
| 10,628,741 B2 | 4/2020 | el Kaliouby et al. | |
| 2010/0211439 A1* | 8/2010 | Marci | H04N 21/4532 705/7.29 |
| 2010/0240416 A1* | 9/2010 | Knight | H04M 1/72522 455/566 |
| 2011/0256520 A1* | 10/2011 | Siefert | G09B 7/073 434/322 |
| 2011/0263946 A1 | 10/2011 | el Kaliouby et al. | |
| 2013/0110565 A1* | 5/2013 | Means, Jr. | G06Q 10/063 705/7.11 |
| 2013/0121591 A1* | 5/2013 | Hill | G10L 15/1815 382/195 |
| 2013/0204664 A1* | 8/2013 | Romagnolo | G06Q 30/0203 705/7.32 |
| 2014/0149505 A1* | 5/2014 | Christiansen | H04L 65/403 709/204 |
| 2016/0379225 A1* | 12/2016 | Rider | G06K 9/00248 382/116 |
| 2017/0046496 A1* | 2/2017 | Johnstone | G06F 19/00 |
| 2017/0098122 A1 | 4/2017 | el Kaliouby et al. | |
| 2018/0018507 A1* | 1/2018 | Chetlur | H04N 21/44008 |
| 2018/0144649 A1* | 5/2018 | el Kaliouby | G06K 9/00288 |
| 2018/0204111 A1* | 7/2018 | Zadeh | G06K 9/3233 |
| 2018/0300851 A1* | 10/2018 | Elor | G06T 3/0093 |
| 2018/0303397 A1* | 10/2018 | Krupat | G06Q 30/0282 |
| 2018/0317831 A1* | 11/2018 | Anderson | G09B 7/00 |
| 2019/0028556 A1* | 1/2019 | Ben-Harrush | H04L 67/306 |
| 2019/0347478 A1 | 11/2019 | Sorci et al. | |
| 2020/0053215 A1* | 2/2020 | Kats | H04M 19/041 |
| 2020/0139077 A1* | 5/2020 | Biradar | G06K 9/00302 |
| 2020/0176019 A1* | 6/2020 | Park | G06F 40/30 |
| 2020/0202129 A1* | 6/2020 | Reyes | G06F 3/017 |
| 2020/0205711 A1* | 7/2020 | Laszlo | A61B 5/7275 |
| 2020/0228359 A1* | 7/2020 | el Kaliouby | G06K 9/00302 |
| 2020/0242657 A1* | 7/2020 | Blacker | G06F 3/165 |

OTHER PUBLICATIONS

McManus, Ashley, "Make Brand Decisions Based on How Customers Feel with Emotion AI," Affectiva, accessed on Aug. 6, 2020, accessed at: https://blog.affectiva.com/make-brand-decisions-based-on-how-customers-feel-with-emotion-ai, 8 pages.

Page, Graham, "Optimizing Advertising Effectiveness: the Peak-End Rule," Affectiva, accessed on Aug. 6, 2020, accessed at: https://blog.affectiva.com/optimizing-advertising-effectiveness-the-peak-end-rule, 8 pages.

McManus, Ashley, "Understanding Brand Purpose with Emotion AI," Affectiva, accessed on Aug. 6, 2020, accessed at: https://blog.affectiva.com/understanding-brand-purpose-with-emotion-ai, 8 pages.

Affectiva, "The Emotion Behind Your Conversation: Transforming the Online Qual Experience,", accessed on Aug. 6, 2020, accessed at: https://blog.affectiva.com/the-emotion-behind-your-online-conversation-transforming-the-qual-experience, 10 pages.

* cited by examiner

FIG. 4D

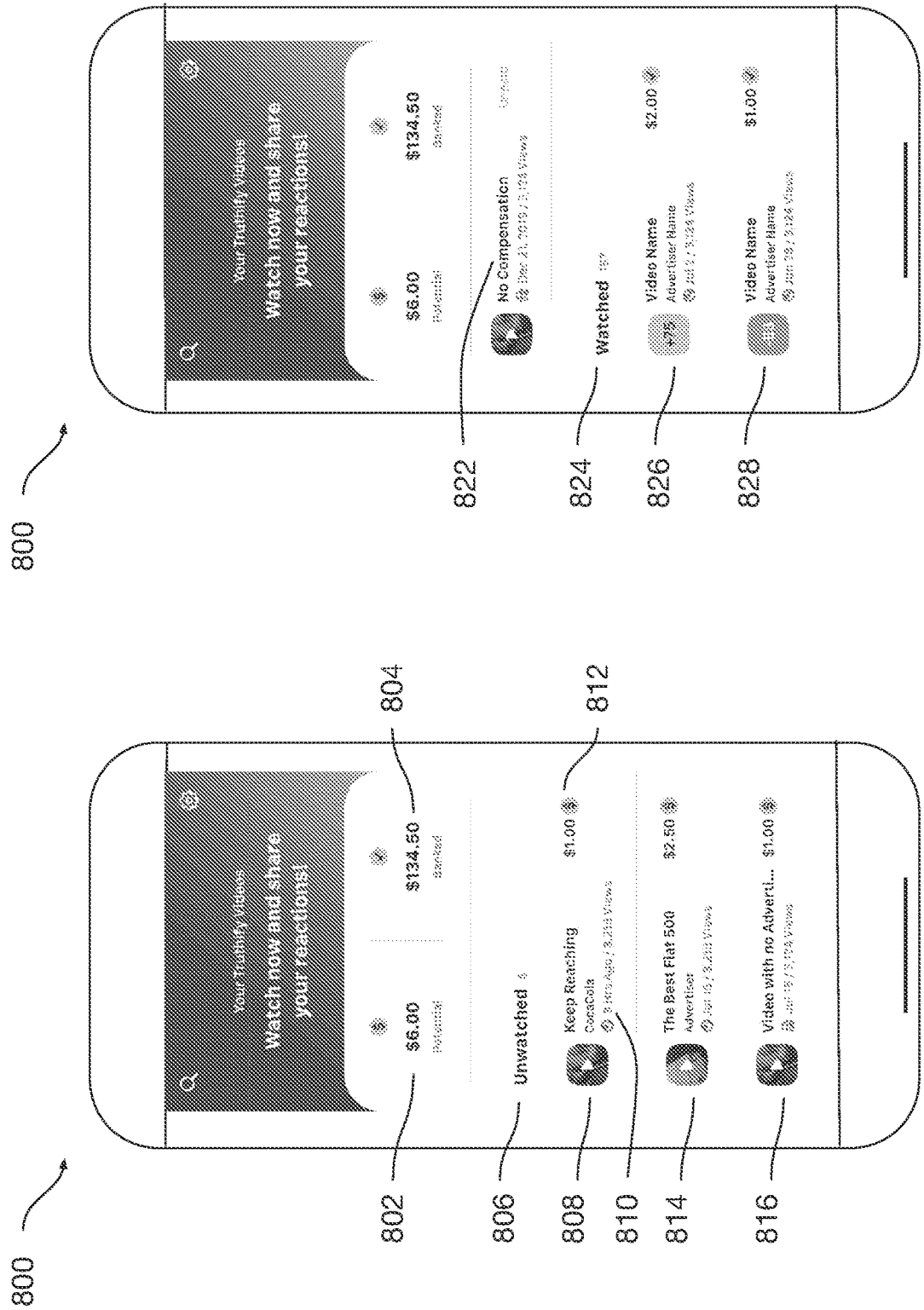

REMOTE REACTION CAPTURE AND ANALYSIS SYSTEM

CROSS-REFERENCE TO RELATED APPLICATIONS

This application claims priority to U.S. provisional patent application Ser. No. 63/022,567 filed May 10, 2020, and entitled "REMOTE REACTION CAPTURE AND ANALYSIS SYSTEM," the entire disclosure of which is hereby incorporated by reference in its entirety.

FIELD OF THE INVENTION

The present disclosure pertains to the field of emotional reaction analysis, and more specifically to the providing actions to be taken following evaluation of consumer reactions to presented content.

BACKGROUND

Understanding consumers' reactions to video campaigns (such as video- and audio-based campaigns) is generally complex, and often campaign organizers rely on in-person interviews, recorded or live-monitored user studies, and/or surveys to determine (or gauge) user reaction to a campaign. These mechanisms can be resource intensive and may be inaccurate due to various biases throughout the process, among other shortcomings.

Emotional reactions, on the other hand, are hard to disguise, and if these emotions can be interpreted correctly, they can be used to help provide an accurate and instantaneous (or near-instantaneous) measure of a campaign's effectiveness.

Existing Emotion Facial Action Coding System (EM-FACS) tools use a video recording device (e.g., camera) to track facial muscle movement and compare the detected movements to an existing dataset to determine the emotions of a person. However, these systems are expensive and difficult to deploy. Furthermore, these systems rely on conducting user tests with a web-based application on a computer/PC which can create an artificial environment that many users do not adapt well to. In fact, users may often be reluctant to turn on a camera for use with a web browser in the first instance.

SUMMARY

In one embodiment of the present invention, a method is provided for informing a user about the emotional response of the user to a presentation, the method comprising: presenting to the user a presentation; monitoring facial expressions of the user while presenting the presentation; analyzing the facial expressions of the user to determine a first emotion conveyed by the facial expressions of the user, wherein the first emotion is the strongest emotion displayed at a specific time in the presentation; correlating the facial expressions of the user conveying the first emotion to one or more portions of the presentation; presenting to the user information about the first emotion conveyed by the facial expressions of the user along with information about the one or more portions of the presentation that correspond to the correlated facial expressions of the user conveying the first emotion; selecting from a number of action options a suggested action that corresponds to the first emotion; and providing the user with an opportunity to take the suggested action.

In another embodiment of the present invention, a system is provided for informing a user about the emotional response of the user to a presentation, the system comprising: presentation hardware for presenting to the user a presentation; monitoring hardware for monitoring facial expressions of the user while presenting the presentation; a processor adapted to analyze the facial expressions of the user to determine a first emotion conveyed by the facial expressions of the user, wherein the first emotion is the strongest emotion displayed at a specific time in the presentation; said processor further adapted to correlate the facial expressions of the user conveying the first emotion to one or more portions of the presentation; said presentation hardware further being adapted to present to the user information about the first emotion conveyed by the facial expressions of the user along with information about the one or more portions of the presentation that correspond to the correlated facial expressions of the user conveying the first emotion; said processor further being adapted to select from a number of action options a suggested action that corresponds to the first emotion; and provide the user with an opportunity to take the suggested action.

In another embodiment of the present invention, a method is provided informing a user about the emotional response of the user to a presentation, and for presenting a suggested action to the user in response to the emotional response of the user, the method comprising: presenting to the user a presentation; monitoring facial expressions of the user while presenting the presentation; analyzing the facial expressions of the user to determine a first emotion conveyed by the facial expressions of the user, wherein the first emotion is the strongest emotion conveyed at a specific time in the presentation; assigning a confidence indicator to the first emotion, said confidence indicator indicating the likelihood the user is conveying the first emotion; correlating the facial expressions of the user conveying the first emotion to one or more portions of the presentation; presenting to the user information about the first emotion conveyed by the facial expressions of the user if the confidence indicator is at or above a predetermined threshold, along with information about the one or more portions of the presentation that correspond to the correlated facial expressions of the user conveying the first emotion; selecting from a number of action options a suggested action that corresponds to the first emotion if the predetermined threshold for the confidence indicator is met or exceeded; and providing the user with an opportunity to take the suggested action.

These and other embodiments of the present invention are further explained in the detailed description of the invention and specified in the claims

BRIEF DESCRIPTION OF THE DRAWINGS

FIG. 4a-4e shows an example home screen of an application used in some embodiments of the present invention;

FIG. 8a-8b show example user screens displayed in some embodiments of the present invention;

Figure 1:
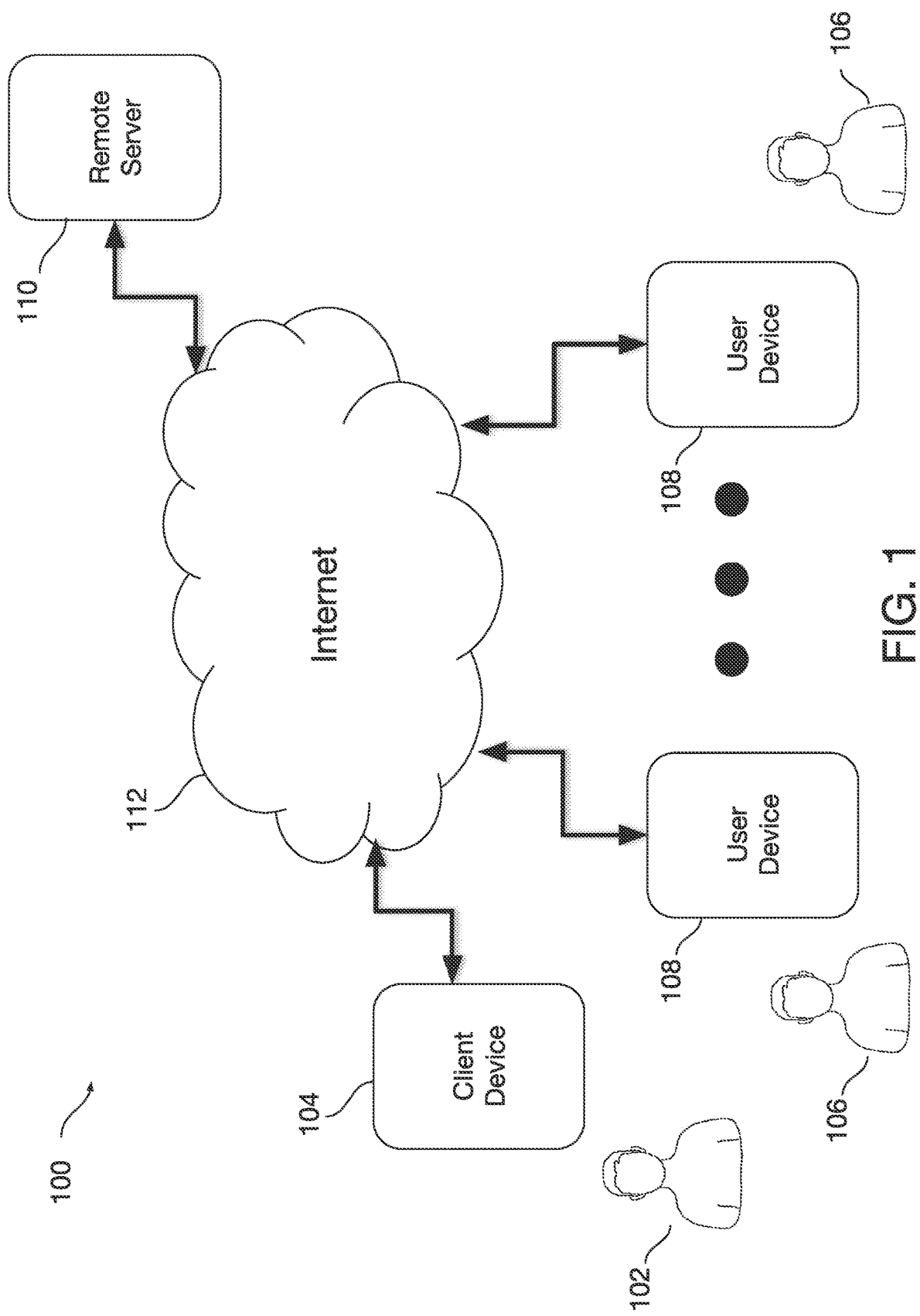
FIG. 1 is a diagram showing hardware and connections for implementing a system according to some embodiments of the present invention.

In addition, the drawings are for the purpose of illustrating example embodiments, but it is understood that the inventions are not limited to the arrangements and instrumentality shown in the drawings.

DETAILED DESCRIPTION

Various systems, devices, and methods discussed herein describe aspects of a new system that can be rapidly deployed to measure the emotional response to a video campaign, with geographically diverse users. The system may support both paid and unpaid campaigns, and the results are available readily to both the user and the client (for example, a campaign organizer or planner).

The system described herein, provides a platform to deploy, test, and evaluate a campaign to capture indications of the emotional reactions of a user who is viewing a campaign. These indications may include facial expressions or facial muscle movements of the user. The campaign may be conveyed via one or more presentations that are presented to the users. The term "campaign" as used herein may refer to one or more presentations. Presentations may take the form of videos, combined picture-and-text presentations, slide shows showing pictures and/or text, or any other type of presentation that takes place over a time period during which the user may experience the presentation. Presentations may contain audio and, in some cases, may consist solely of audio with no visual component.

The system promotes undivided attention from the user and obtains data in a manner that is sensitive to privacy considerations, without necessarily storing a user image or video. The system can dynamically select actions to present to the user (e.g., modify messaging banners, redirect to any website, sign a petition, etc.) based on emotions detected from the user. For example, some emotions that may be detected include happiness/joy, sadness, anger, contempt, fear, disgust, and surprise. The system offers both compensation and non-compensation based testing.

Figure 2:
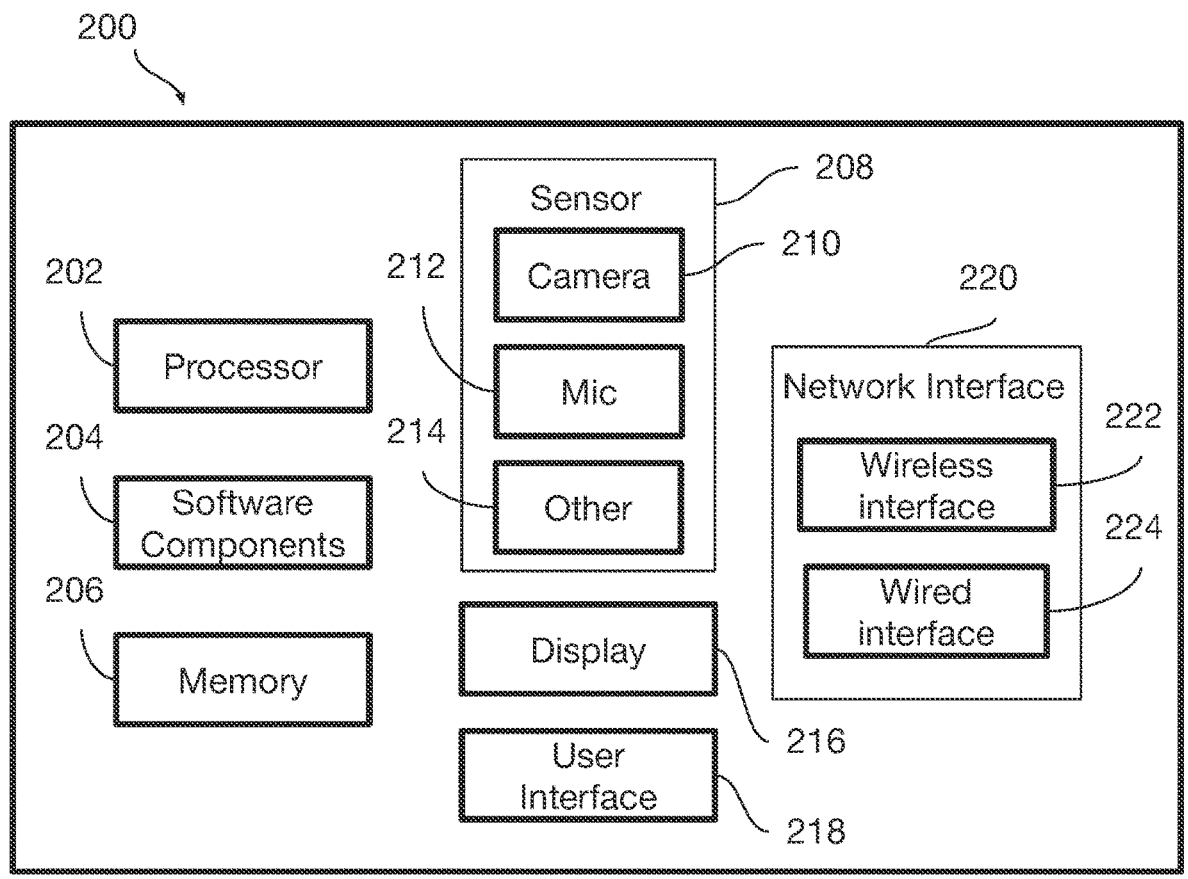
FIG. 2 is a block diagram of a processing device for use in some embodiments of the present invention.

As shown in in FIG. 1, a client 102 (e.g., campaign organizer) may interface with the system on a client device 104 using, for example, a web-based application. The client device 104 may be, for example, a connected processing device (e.g., computer or mobile device) such as, for example, the processing device 200 shown in FIG. 2. Note that not all the functionality shown in FIG. 2 is required for the client device 104. Similarly, users 106 may interface with the system on user devices 108 using, for example, a software application running on the user devices 108. The client device 104 and the user devices 108 generally communicate with a remote server 110 through the Internet 112. In some examples, the client device 104 may communicate directly with a user device 108. Examples of such applications that employ embodiments of the present invention are the Truthify® Client web application and the iOS/Android™ Truthify® apps.

The user device 108 may be, for example, a wirelessly connected processing device (e.g., mobile phone, tablet device, watch, connected glasses, laptop, etc.) such as, for example, the processing device 200 shown in FIG. 2. Note that not all the functionality shown in FIG. 2 is required for the user device 108.

As shown in FIG. 1, embodiments of the present invention may be implemented using a system 100 in which the user device 108 generally communicates with a remote server 110 through the Internet 112. In some embodiments, the user device 108 may communicate directly with another user device 108 or directly with the client device 104.

In some embodiments of the present invention, a client 102 (who may be, for example, a campaign designer) uses the client device 104 to create or otherwise develop one or more presentations in a campaign. These presentations are presented to users 106 via user devices 108. The users 106 view or otherwise experience the presentations of the campaign, and the users' emotional reactions to the campaign are analyzed by one or more elements of the system 100. In one embodiment, the analysis of the users' emotional reactions comprises the analysis of facial expressions or facial muscle movements of the user 106. Based on this analysis, the users 106 are presented with opportunities to take action, with those opportunities selected to correspond to the users' emotional reactions. In one embodiment, the analysis of emotional reactions takes place on the user devices 108, and the opportunities to take action are also provided via the user devices 108. In other embodiments, the analysis may take place at the remote server 110, at the client device 104, or at a combination of these devices, with or without relying on analysis performed at the user devices 108.

FIG. 2 depicts a processing device 200 for use with the present invention. For example, the client device 104 and/or the user device 108 may be a processing device 200 substantially as shown in FIG. 2. The processing device 200 comprises a processor 202 that is configured to process data using, for example, software components 204 according to instructions stored in memory 206. The memory 206 may also store some or all of the software components 204. Example software components for use with the present invention may include emotion evaluation software, user interface software, and messaging software, either employed as different applications or combined into one or more hybrid applications.

In the illustrated embodiment, the memory 206 is a machine-readable medium storing instructions that can be executed by the processor 202. The memory 206 may also be used during the processing of data (such as video data) captured by sensors (such as a camera) and/or during the analysis of such data to determine a user's emotional response and compute an emotion index.

The processing device 200 further comprises one or more sensors 208, which may comprise a camera 210, a microphone 212, and/or another sensor 214 such as a temperature sensor, heart rate sensor, or accelerometer. These sensors may be used for monitoring the user 106 and may be termed monitoring hardware. A display 216 such as, for example, an LCD, LED, or OLED video display, displays images to users 106 of the processing device 200. A user interface 218, such as, for example, a touchscreen interface, mouse-based point-and-click interface, keyboard, microphone, etc., allows the user 106 to interact with the device. A speaker provided on the processing device 200, a headphone jack, a Bluetooth connection, or the like may be used to provide audio output. Different configurations of display and audio hardware may be possible, and such hardware may be termed presentation hardware.

In some embodiments, network interface 220 facilitates a data flow between the processing device 200 and other devices via the Internet 112 or another data network. In some embodiments, network interface 220 can include one or both of a wireless interface 222 and a wired interface 224. The wireless interface 222, also referred to as a radio frequency (RF) interface, provides network interface functions for the processing device 200 to wirelessly communicate with other devices (e.g., other user devices 108, client devices 104, and/or remote servers 110 either directly or via the Internet 112) in accordance with a communication protocol (e.g., any wireless standard including IEEE 802.11a, 802.11b, 802.11g, 802.11n, 802.15, 4G/5G mobile communication standard, and so on.). Wireless interface 222 may include one or more radios. To receive wireless signals and to provide the wireless signals to the wireless interface 222 and to transmit wireless signals, the processing device 200 may include one or more antennas. The wired interface 224 provides network interface functions for the processing device 200 to communicate over wire or cabling with other devices in accordance with a communication protocol (e.g., IEEE 802.3).

The sensors 208, display 216, user interface 218, and network interface 220 may all be connected to the processor 202 and adapted to react to instructions from the software components 204. While the processing device 200 is contemplated to be a separate component, it may also be provided as a component of another piece of hardware.

Figure 3:
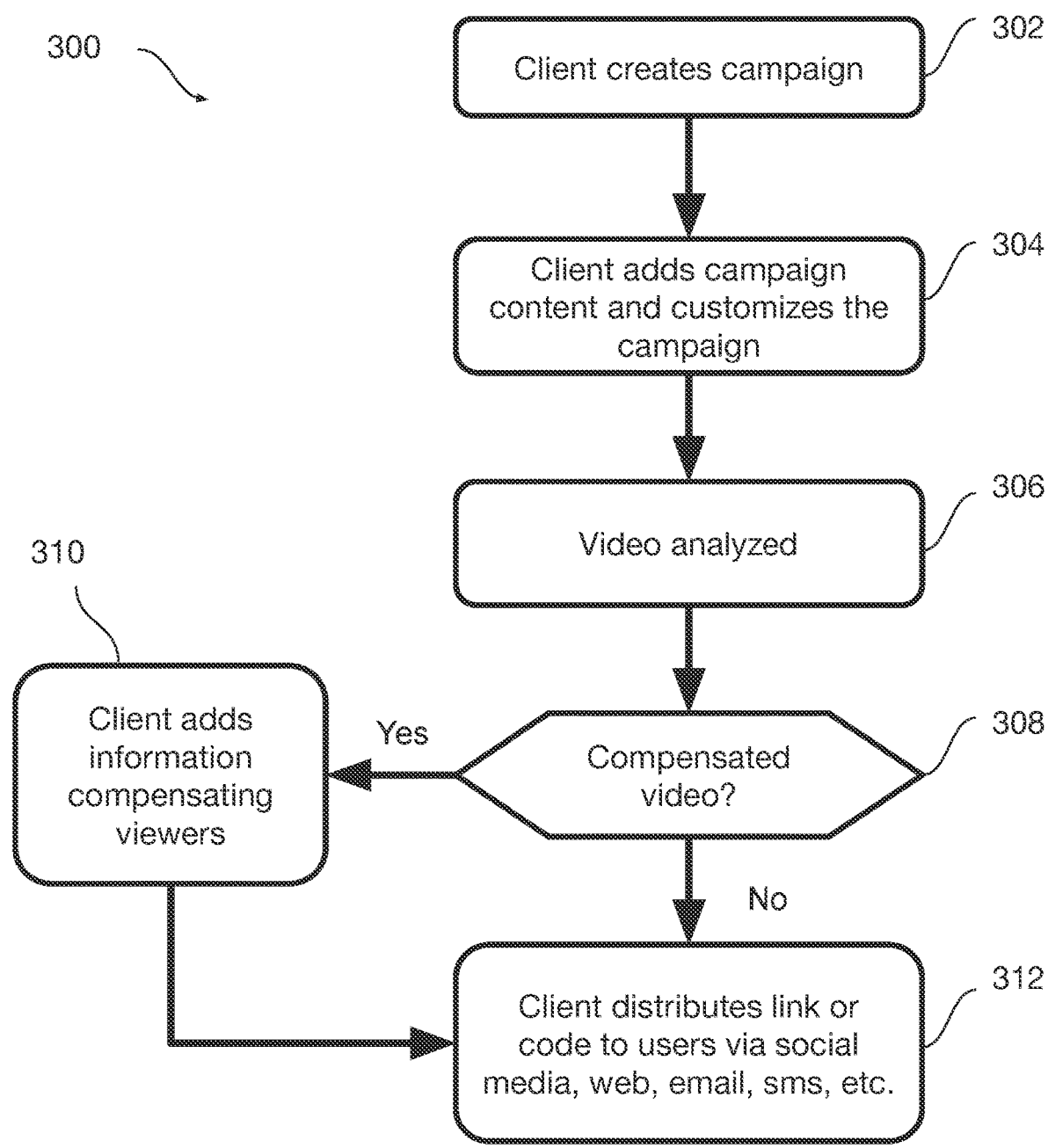
FIG. 3 is a flow diagram of a client campaign authoring phase according to some embodiments of the present invention.

FIG. 3 depicts an example method 300 of a client campaign authoring phase that can be implemented within an operating environment including or involving, for example, the system 100 of FIG. 1. The method 300 may include one or more operations, functions, or actions as illustrated by one or more blocks.

According to an example implementation, the client campaign authoring phase of the disclosed process may begin with a first client accessing a campaign authoring tool via a first client device 104. The client may use the client device 104 to interface with a software application (e.g., stand-alone application, web-based application, etc.) that may run on the client device 104, may be hosted on a remote server 110, or a combination of both. In block 302, the client creates a new campaign using the software application on the client device 104.

Figure 4A:
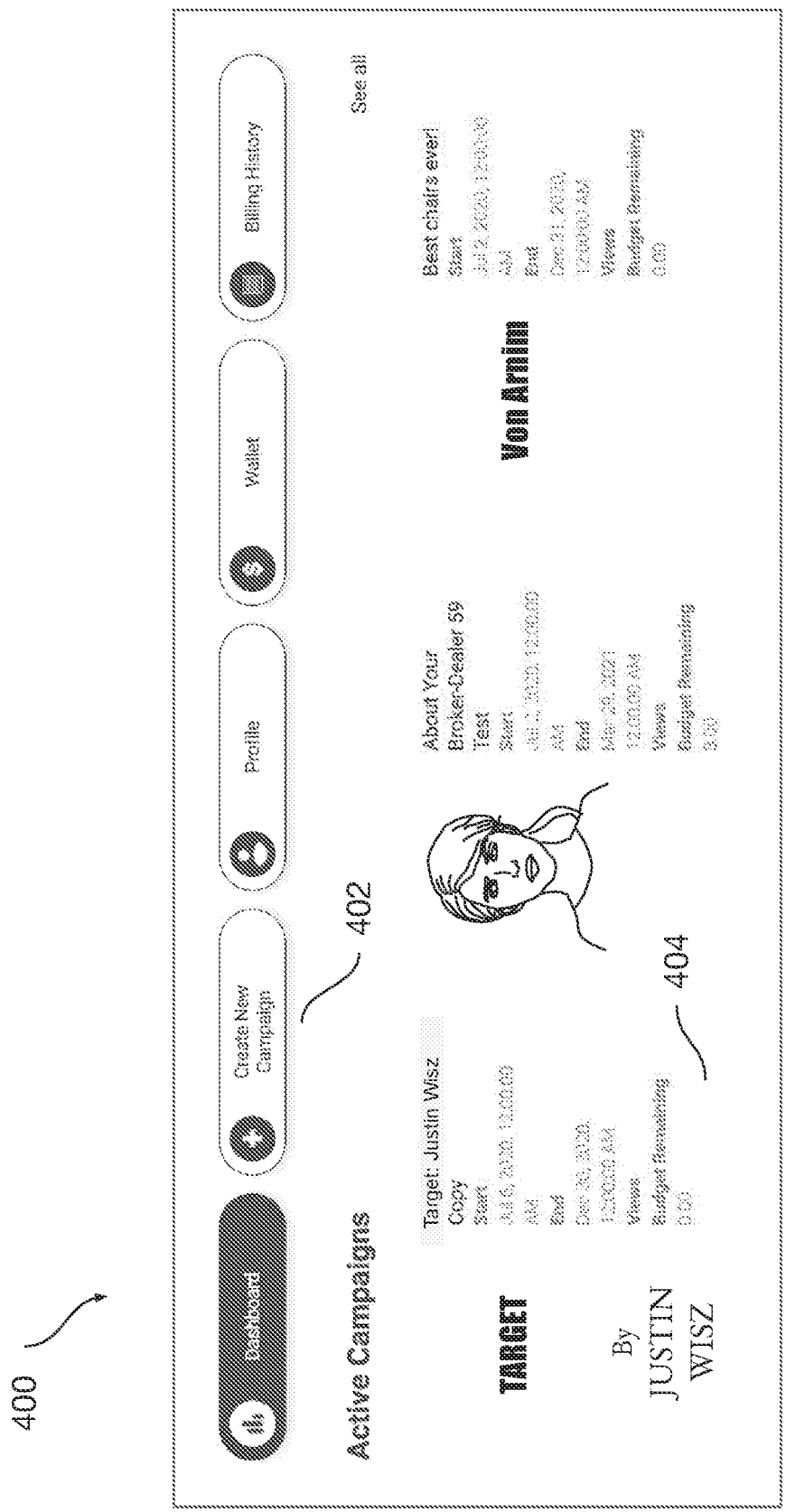

FIG. 4a depicts an example home screen 400 for a web-based application that enables a client to create a new campaign. The home screen 400 may be displayed on a client device 104 and comprises a number of software buttons from which the client may select options using, for example, a touch-screen or mouse-based point-and-click interface, as well as an active campaign display showing information about active campaigns. Further detail on the active campaigns can be accessed in additional screens via selecting the campaigns as shown in FIG. 4a.

In the example shown in FIG. 4a, the client may select the "Create New Campaign" software button 402 to initiate the process of campaign creation. In addition, active campaigns are shown in the screen area 404. As shown at block 304 in FIG. 3, in response to the client selecting the Create New Campaign button 402, the client device 104 presents a view of the campaign authoring tool that enables the client to add content and to customize the campaign. For example, the client may upload or select one or more videos, determine parameters for the campaign, determine if the campaign will provide compensation or not, fund the campaign, create a link to the campaign, which may be a deep link, or other actions.

Figure 4B:
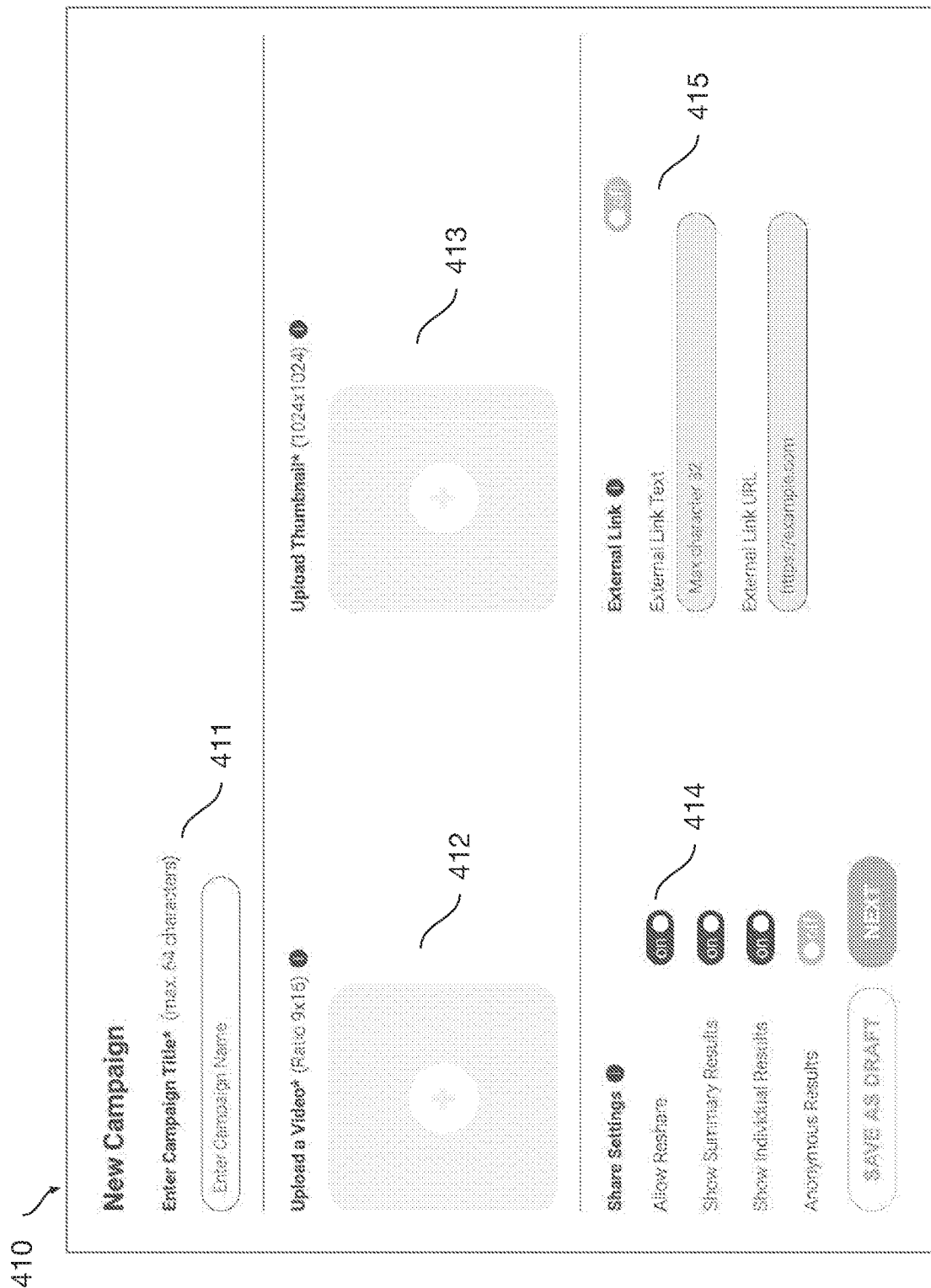

FIG. 4b depicts an example screen 410 for a web-based application that enables a client to add content to a new campaign. In this example, the client may enter a campaign title 411, upload a video 412, upload a thumbnail image 413, determine sharing settings 414, and create an external link 415.

Figure 4C:
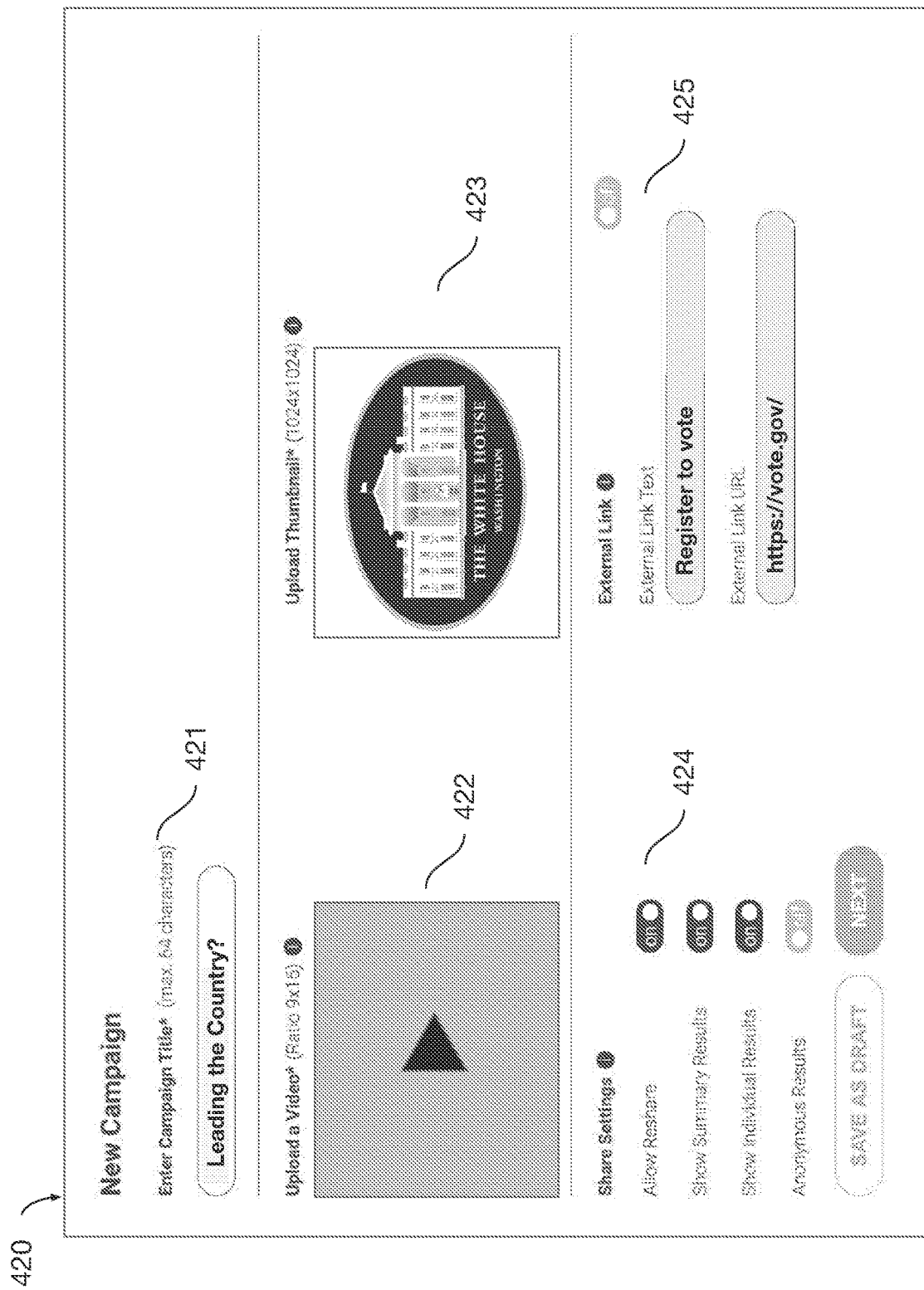

FIG. 4c depicts an example screen 420 for a web-based application where the client has entered a campaign title 421, selected or uploaded a video 422, uploaded a thumbnail image 423, selected several sharing settings 424, and created an external link 425.

Figure 4D:
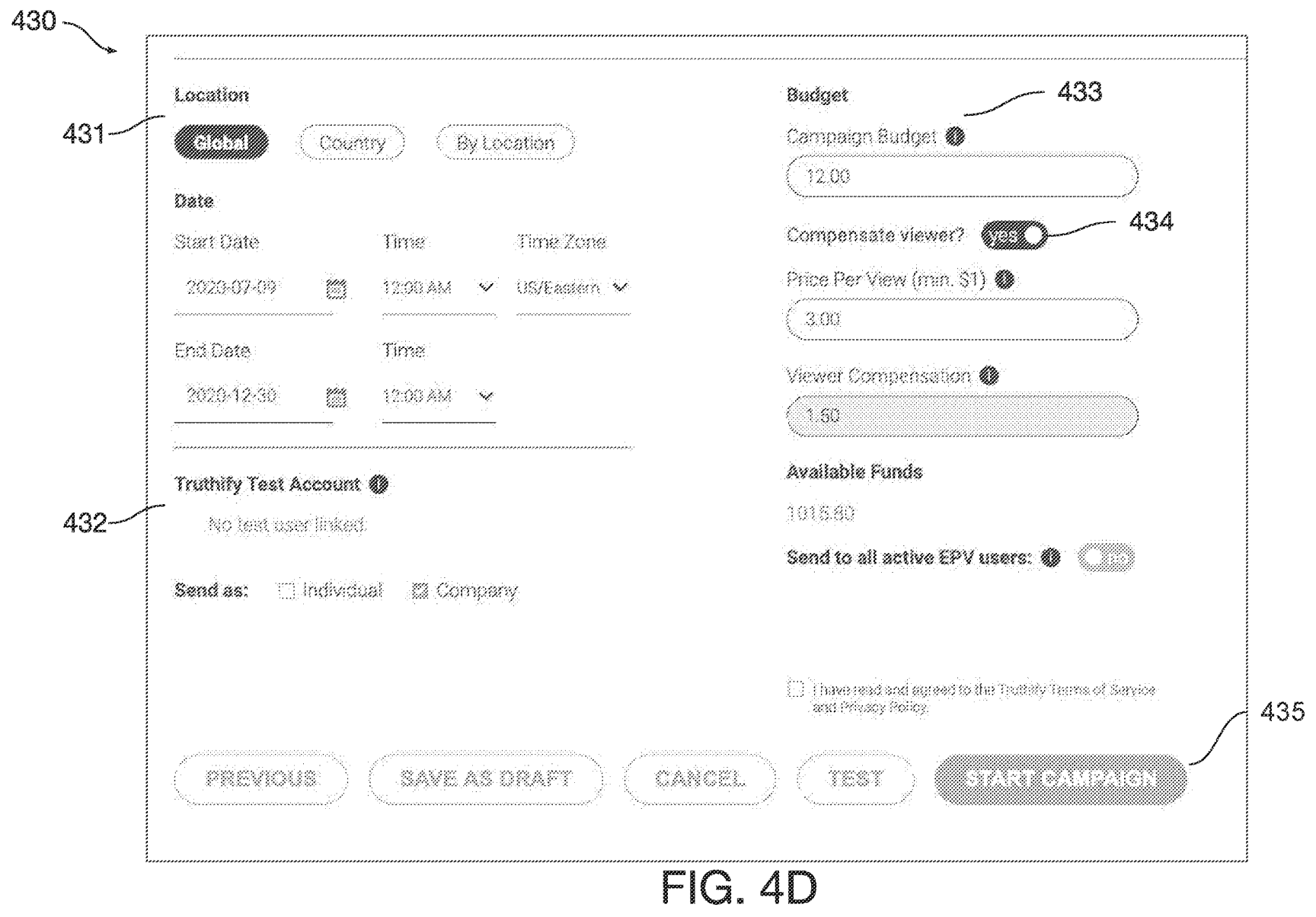

FIG. 4d depicts an example screen 430 for a web-based application that may enable a client to add additional content to a new campaign. In this example, the client may enter campaign location information 431, test account information 432, and a campaign budget 433.

In some examples, the client may select a desired emotional response for the campaign. For example, the campaign may be designed to elicit a particular emotion (happiness, sadness, anger, joy, etc.). In one example, the selection of a desired emotional response may be from a list of emotional responses (such as, for example, a drop-down menu). In one example, the selection of a desired emotional response may be for the entire video. For example, the desired emotional response for the video may be "happiness." In another example, the selection of a desired emotional response may correspond to only a portion of the video campaign and/or may be time-based such that the desired emotional response may change throughout the video. For example, the desired emotional response for a 30 second video may start with "sadness" for the first 10 seconds, shift to "surprise" for the second 10 seconds, and finally shift to "happiness" for the final 10 seconds. In one example, the selection of a desired time-based emotional response may involve a combination of selecting a time interval and selecting an emotion.

In another example, the selection of a desired time-based emotional response may involve user input modifying one or more curves representing one or more emotions on a graph that plots a confidence indicator of the emotional response as a function of time. In some examples, the desired emotional response for the campaign may be used by the system to determine if the campaign (when the campaign is active) is matching the desired emotional response with the users 106. This may be done, for example, by aggregating one or more of the responses from one or more users 106 to see if the aggregated response is following the desired emotional response. If the system determines that the campaign is not following the desired emotional response, then a notification may be sent to the client indicating the results are not matching the response. The client may use this information to modify the campaign to address this discrepancy.

Referring to FIG. 3, at block 306, the system automatically analyzes the uploaded video and/or thumbnail for characteristics that may improve the campaign. For example, if the campaign is desired to provide a positive emotional response, then an analysis of the video may trigger several suggestions to change the video to provide a better chance of a positive emotional response. In some examples, the analysis of the video and/or thumbnail may involve identifying certain characteristics of the video and/or thumbnail, referencing a database mapping such characteristics to emotional responses, and determining a projected emotion based on such information. For example, a narrator wearing a green shirt generally elicits a happier emotional response than a narrator wearing a red shirt. In some examples, if the system identifies any characteristics that are known to elicit certain emotional responses that are not consistent with the desired emotional response, the system will notify the client.

At block 308, the client determines if the campaign will compensate users 106 for viewing the campaign. This may be done, for example, in exchange for more detailed information about the user 106 that is viewing the campaign. Alternatively, some campaigns will not pay users 106 for viewing the campaign. In this case, for example, the client may only get aggregated information about users 106 who view the campaign. At block 310, the client adds information specific to compensating users 106 during the campaign. FIG. 4d depicts an example screen 430 for a web-based application that may enable a client to compensate users 106 for viewing the campaign. In this example, the client enters a campaign budget 433 and chooses to compensate the users 106 using the on-screen switch 434.

At block 312, the user 106 starts the campaign and distributes the link and/or code corresponding to the campaign. Referring back to FIG. 4d, once the campaign information is complete, the client may select the "Start Campaign" software button 435 to launch the campaign.

Figure 4E:
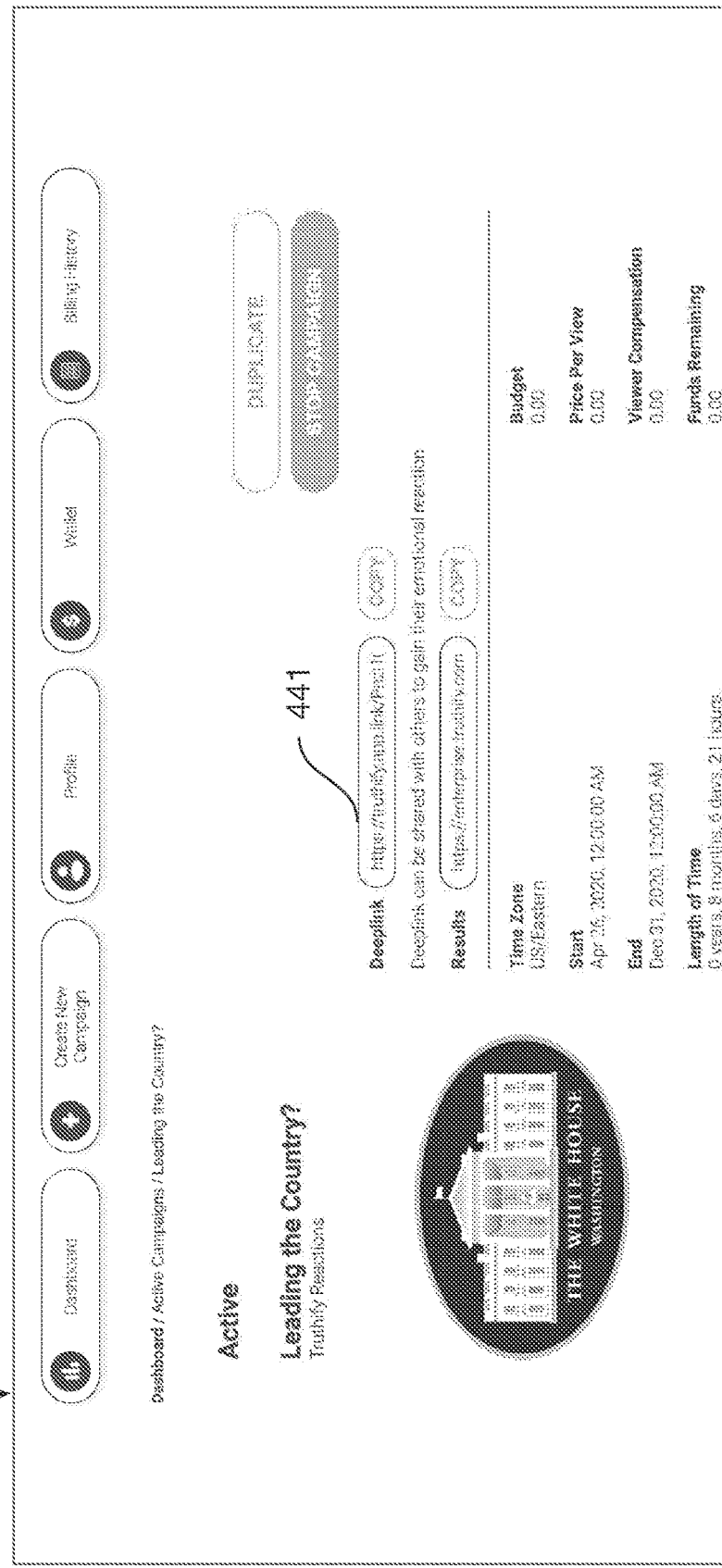

FIG. 4e depicts a portion of an example screen 440 for a web-based application that may enable a client to see the final campaign. The client can copy the link 441 or code for distribution by the client to potential users 106. In another example (not shown), the link or code may be distributed directly by the system. An example of such a system is the Truthify® application. In one example, the link or code may be distributed to established users 106 of the system matching a desired profile. In another example the link or code may be distributed directly to social media matching a desired profile. In one example, a dedicated software "Social Media" button (e.g., "Facebook," "Instagram," etc.) is provided on the screen 440 to launch the campaign directly on a social media service.

Figure 5:
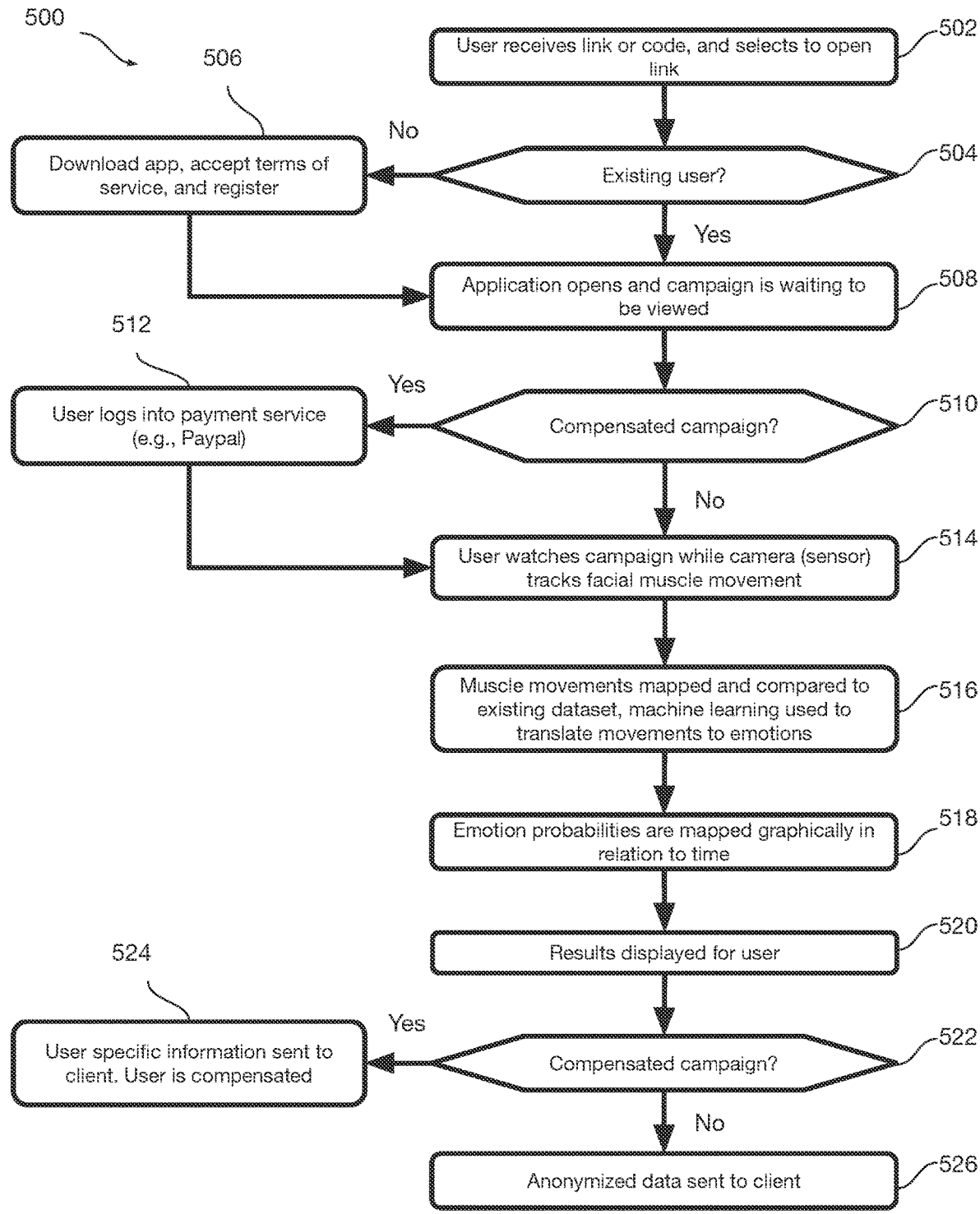
FIG. 5 is a flow diagram of a user viewing phase according to some embodiments of the present invention.

We now turn from a description of a client creating a campaign to the user experience in viewing and interacting with a campaign or a presentation within a campaign. FIG. 5 depicts an example method 500 of a user viewing phase that can be implemented within an operating environment including or involving, for example, the system 100 of FIG. 1. According to an example implementation, the user viewing phase of the disclosed process may begin with a first user 106 accessing the disclosed campaign tool via a first user device 108 (see FIG. 1). The user 106 may use the user device 108 to interface a software application (e.g., stand-alone application, embedded application, web-based application, etc.) that may run on the user device 108, be hosted on a remote server 110, or a combination of both. In block 502, the user 106 receives a link or code, and selects the link or code to open the campaign. For example, the link or code may be received in an email, SMS message, direct message, in-app message, or other communication method. In another example, the link or code is embedded with an image on a social media platform, web page, email, etc.

Figure 6:
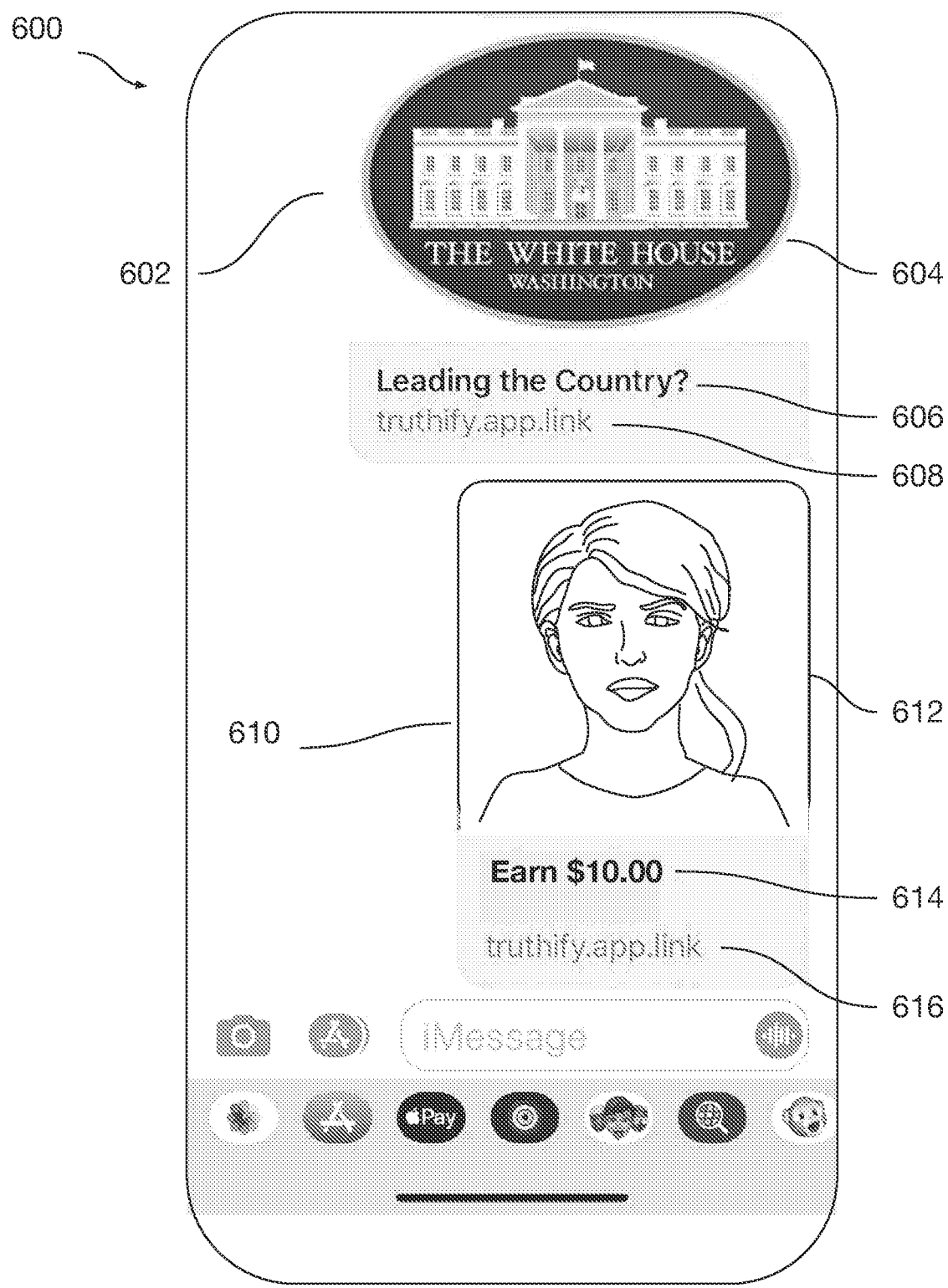
FIG. 6 shows an example screen that may be presented to a user in some embodiments of the present invention.

FIG. 6 depicts an example screen 600 of a user device 108 that may enable a user 106 to select a link to open the campaign. In this example, the user 106 has received two SMS messages 602, 610, each with a link to open a campaign. The first SMS message 602 is an unpaid campaign with a thumbnail image 604, a tagline 606, and a link 608. The second SMS message 610 is a paid campaign with a thumbnail image 612, a tagline 614 that incorporates the campaign compensation, and a link 616.

In block 504, a determination is made if the user 106 is already registered and/or has downloaded the application for viewing the campaign. User registration may be determined, for example, using a login prompt for a dedicated software application.

In block 506, an unregistered user 106 is taken to a screen to download the application, accept the terms of service, and register. In one example, a user 106 is redirected to an app store that is associated with the user device 108 and/or a specific operating system of the user device 108. In another example, a user 106 is directed to a web page.

Figure 7C:
FIGS. 7a-7c show example screens that may be presented to onboard a user in some embodiments of the present invention.
Figure 7B:
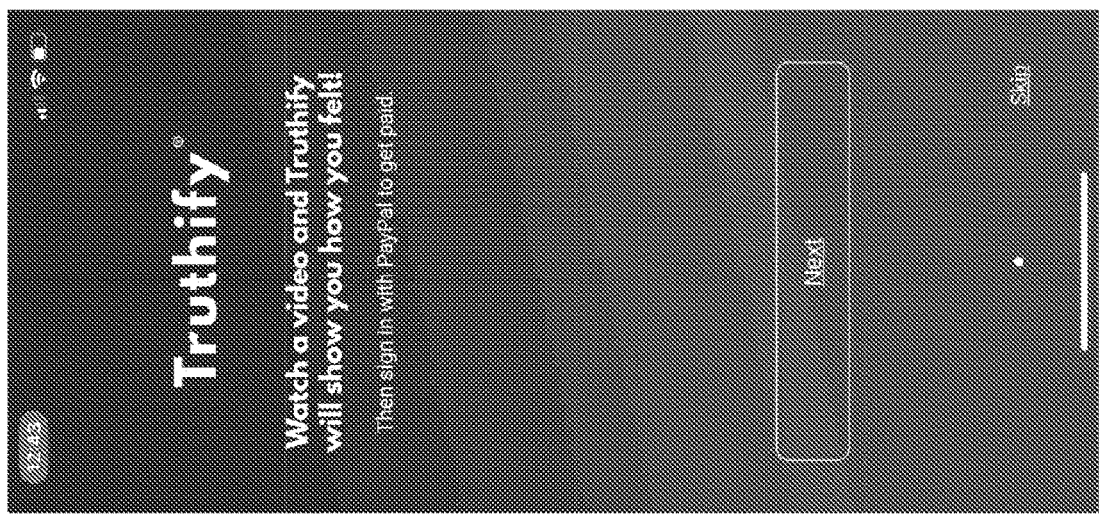
Figure 7A:
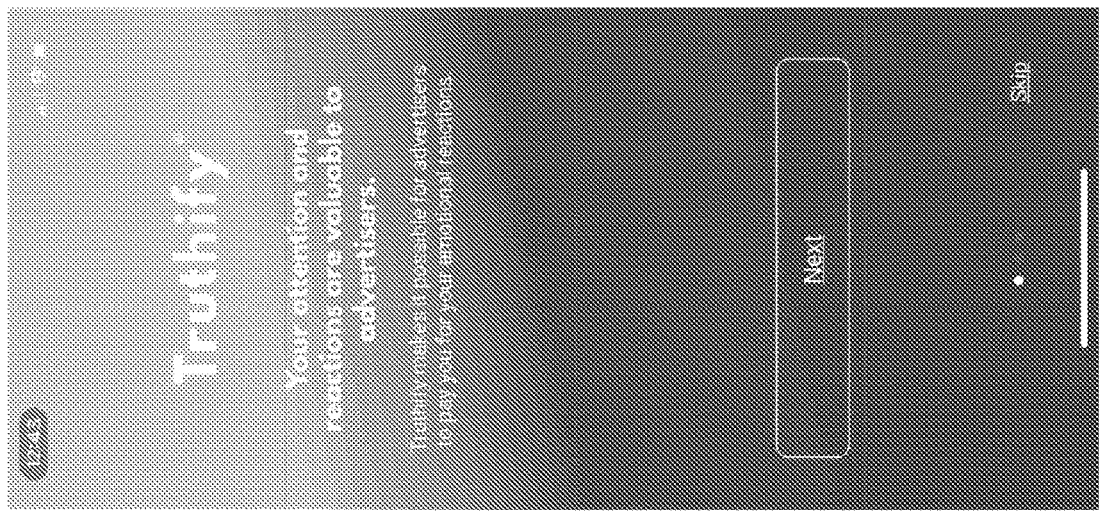

FIG. 7a-7c depict an example of a progression of 3 screens that are used to help onboard a new user 106. These screens highlight several features and advantages of the system. In addition to these screens shown, several additional screens may be used to register a new user 106. In the screens shown in FIGS. 7a-7c, the basic functionality of the system is explained to the user and the user is prompted to begin viewing a presentation or campaign. The user 106 may be prompted to go through a user registration process that, for example, connects the user device 108 with the user's email address or other details about the user 106.

In block 508, an application opens on the user device 108 and the campaign is waiting to be viewed. In one example, the application is a dedicated application for viewing campaigns. In another example, the application provides functionalities in addition to facilitating the viewing of campaigns. For example, the application may be a social media application such as Facebook, Instagram, LinkedIn, etc., or may be linked-to via links provided on such social media applications. In one example, when the application opens, the campaign is loaded and ready to view. This is particularly useful for new registrants as it lowers the friction to start viewing a campaign.

FIG. 8a depicts an example home screen 800 on a user device 108. In one embodiment, information is presented to the user 106 via a touchscreen, and the user 106 may interact with the touchscreen using software buttons presented by the system. The home screen 800 displays several different types of information a user 106 may find helpful. In this example, the home screen 800 shows how much money can be earned 802 as well as how much money the user 106 has earned so far 804. The screen 800 also shows campaigns that the user 106 has not yet watched, shown via the unwatched campaigns indicator 806. In this example, there are 4 unwatched campaigns; 3 unwatched campaigns 808, 814, 816 are shown in FIG. 8a, and 1 unwatched campaign 822 is shown in FIG. 8b.

Campaign 808 is unwatched, and its information is shown in an information indicator 810, which displays information such as the campaign title and tagline, information on when the campaign was made available, and how many views it has had. Additional information, such as, for example, the time the campaign will be closed, may be provided. A compensation indicator 812 shows that the user 106 can earn money for watching this campaign (in this case, $1.00). Other unwatched campaigns are listed via their campaign thumbnails as shown at 814 and 816. In some examples some or all of the elements of the campaign may be selectable via a software-based selection mechanism to obtain additional information.

FIG. 8b depicts a screen 800 showing additional campaign information. An entry 822 for a watched campaign is shown, and a watched campaign indicator 824 is provided over a list of watched campaigns, along with information about the number of campaigns watched by the user 106. Watched campaigns are listed as shown with the entries 826, 828. For campaign 826, information about when the campaign was viewed, an emotional index score (e.g., "+75") that may be color coded to highlight the predominant emotion, and a campaign information section are shown. In this example, the campaign information section includes, for example, a tagline, information about the emotive response of the user 106, and an indicator of how many people have viewed the campaign. Additional or different information may also be displayed. In some examples some or all of the elements of the campaign may be selectable to obtain additional information. In some embodiments, users may be presented with the option to see other users' reactions to campaigns, which may be depicted by showing information about other users for each video, such as their emotion index (as described below).

Returning to FIG. 5, At block 510, a determination is made if the new campaign is a compensated campaign. For example, a campaign may have a field that indicates if compensation is provided in the campaign. In another example, a campaign having a compensation amount of $0.00 may be used to indicate that there is no compensation provided in the campaign. At block 512, the user 106 logs into their payment service (e.g., PayPal) and/or connects the application with the user's payment service. For example, this may involve entering the user's credentials into a payment service account. This could also be done, for example, via credential sharing with a payment services application. In some examples, blockchain-based cryptocurrencies can be used to exchange payments or payment information between the client 102 (or client's organization) and the user 106. At block 514, one or more sensors (e.g., camera, microphone, heart rate monitor, temperature monitor, accelerometer, etc.) on the user device 108 are activated for monitoring indications of the emotional response of the user 106, and the campaign is initiated. For example, the camera may be used to monitor facial expressions or facial muscle moments, or the microphone may be used to monitor changes in voice inflection of the user 106 that could indicate an emotion being conveyed.

Figure 9B:
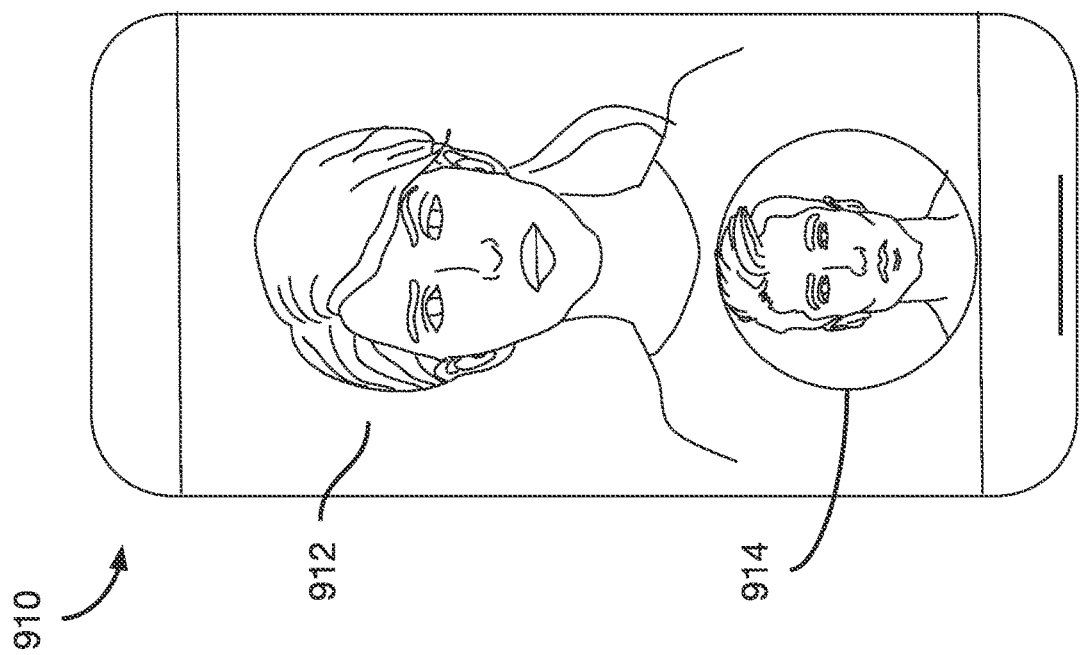
FIGS. 9a-9b shows example user face positioning screens and a campaign video play screen displayed in some embodiments of the present invention.
Figure 9A:
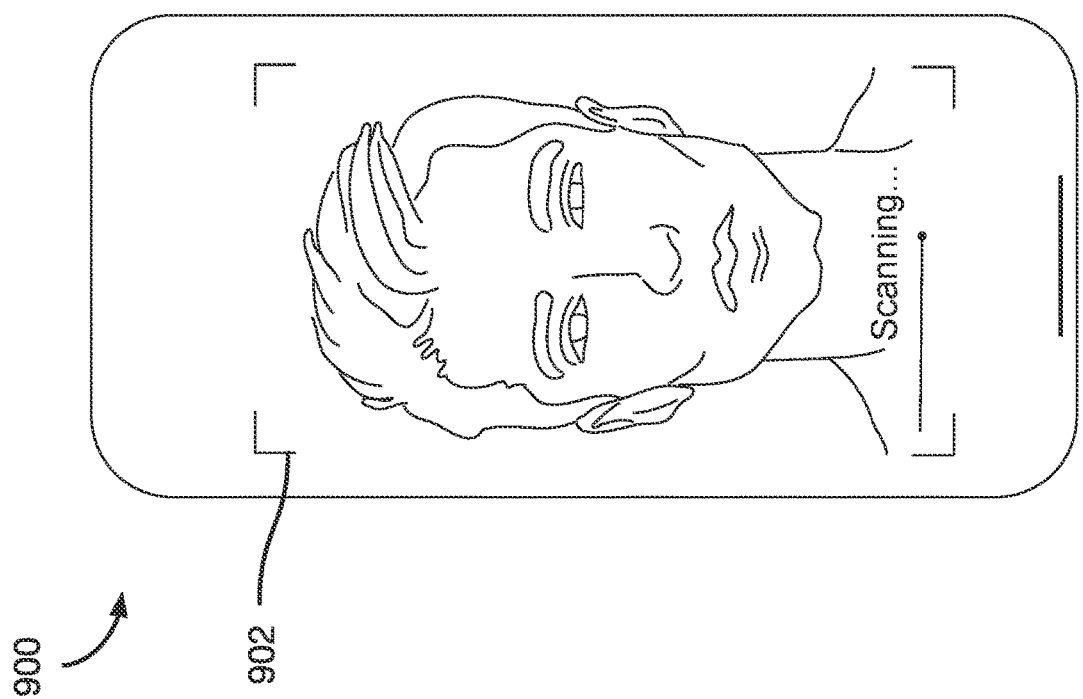

In one example, the camera is activated, and the user 106 positions their face such that it is framed within the screen. The camera is used to capture and track the facial muscle movements of the user 106 while they are watching the campaign. FIG. 9a depicts an example screen 900 where a frame 902 is displayed on the screen for the user 106 to position their face in the frame. Once the user 106 is positioned within the frame, the campaign begins. FIG. 9b depicts an example screen 910 of a campaign video being played. In this example, there is a user image 914 that shows the camera view of the user 106 while they are watching the campaign 912. In one example, the user 106 must keep their face framed and must be facing within 20 degrees of forward toward the camera or the campaign will pause. Other mechanisms may be used to determine that the user 106 is within frame and/or paying attention to the campaign.

At block 516, the facial expressions of the user 106 (which may comprise facial muscle movements of the viewer) captured by the camera on the user device 108 are mapped and compared to an existing expression dataset. The facial expressions are analyzed, and artificial intelligence may be used to translate the movements or expressions to emotions conveyed. In one embodiment, at any given time of a presentation only the strongest emotion being conveyed is recorded by the system. These emotions may be correlated by the system with specific times or portions of the presentation, which in turn are correlated with elements of the presentation (such as words being said or shown, or images being shown) that are being presented at the times the expressions conveying the emotions are monitored.

In one example, the mapping and comparison functions as well as the determination of the emotions are done locally on the user device 108. This can enable the local device to respond instantly (or substantially instantly) when an emotion of the user 106 is determined. In some examples, when a particular emotion of the user 106 is determined, the system presents a suggested action, such as a follow-on action or "a call to action," on the screen that may be based on the particular emotion and/or the confidence indicator of the emotion that is determined. This action may be presented simultaneously with the presentation to the user 106 of information regarding the emotion conveyed by the user 106 at specific portions of the presentation.

The follow-on action may be presented to the user 106 at a number of different times. For example, the follow-on action may be presented to the user 106 while the user 106 is viewing the presentation if the system determines the user's emotional reaction to the presentation is suitable for a specific follow-on action to be presented. Follow-on actions may also be presented at the end of the presentation.

There may be provided certain pre-determined points in a campaign (i.e., markers) where suggested actions are presented based on emotive reactions. Alternately, there may be suggested actions that are presented whenever an emotion index confidence indicator reaches or exceeds a predetermined threshold. For example, in one embodiment an action may be presented when an emotion confidence indicator reaches or exceeds 70%. In other embodiments, higher or lower emotion index confidence indicators may be used for the predetermined threshold. Follow-on actions may be presented in response to the user 106 having a discrete emotional reaction, or may be presented in response to the user's emotion index achieving a certain level either throughout a portion of a presentation, or through an analysis of the user's reactions over the entirety of the presentation.

For example, if "disgust" is detected above a predetermined threshold confidence indicator during any portion of the playback of a campaign, then a first follow-on action may be presented. If instead "happiness" is detected above a predetermined threshold confidence indicator during the playback of a campaign, then a second follow-on action may be presented instead of the first follow-on action. And in another embodiment, if an analysis of the user's reaction to the entire campaign shows "disgust" to be the most prominent emotion displayed by the user 106, such a user 106 will be presented with a different follow-on action than someone whose reaction to the entire campaign shows "happiness" as their most prominent emotion. Markers may be placed by the client 102 at points in a campaign where an emotional reaction is expected by the user 106. The markers may indicate an expected emotion and a confidence indicator threshold at which a follow-on action should be presented to the user 106 in response to the user's facial expressions conveying the expected emotion. In some examples, when a marker is identified during the viewing of a campaign, the system determines which particular emotion, and in some cases the confidence indicator of the emotion, the user 106 is currently experiencing. Based on the determined emotion and/or confidence indicator of the emotion, one or more follow-on actions are presented.

At block 518, the confidence indicator of the emotions are mapped graphically as a function of time for the campaign. For example, a campaign consisting of a 30 second video campaign may have, for example, the confidence indicator of measured emotions of "happiness" and "sadness" mapped as a function of time. In this example, a first curve for the confidence indicator of "happiness" may start close to 0 at time 0 seconds, rise up to 95% at time 10 seconds, and then drop down to 20% as the time extends to 30 seconds as the video campaign ends. A second curve for the confidence indicator of "sadness" may also start close to 0 at time 0 seconds, but only grow to 10% by the 30 second mark. At block 520, the results are displayed on the user device 108 for the user 106 to view.

Figure 10:
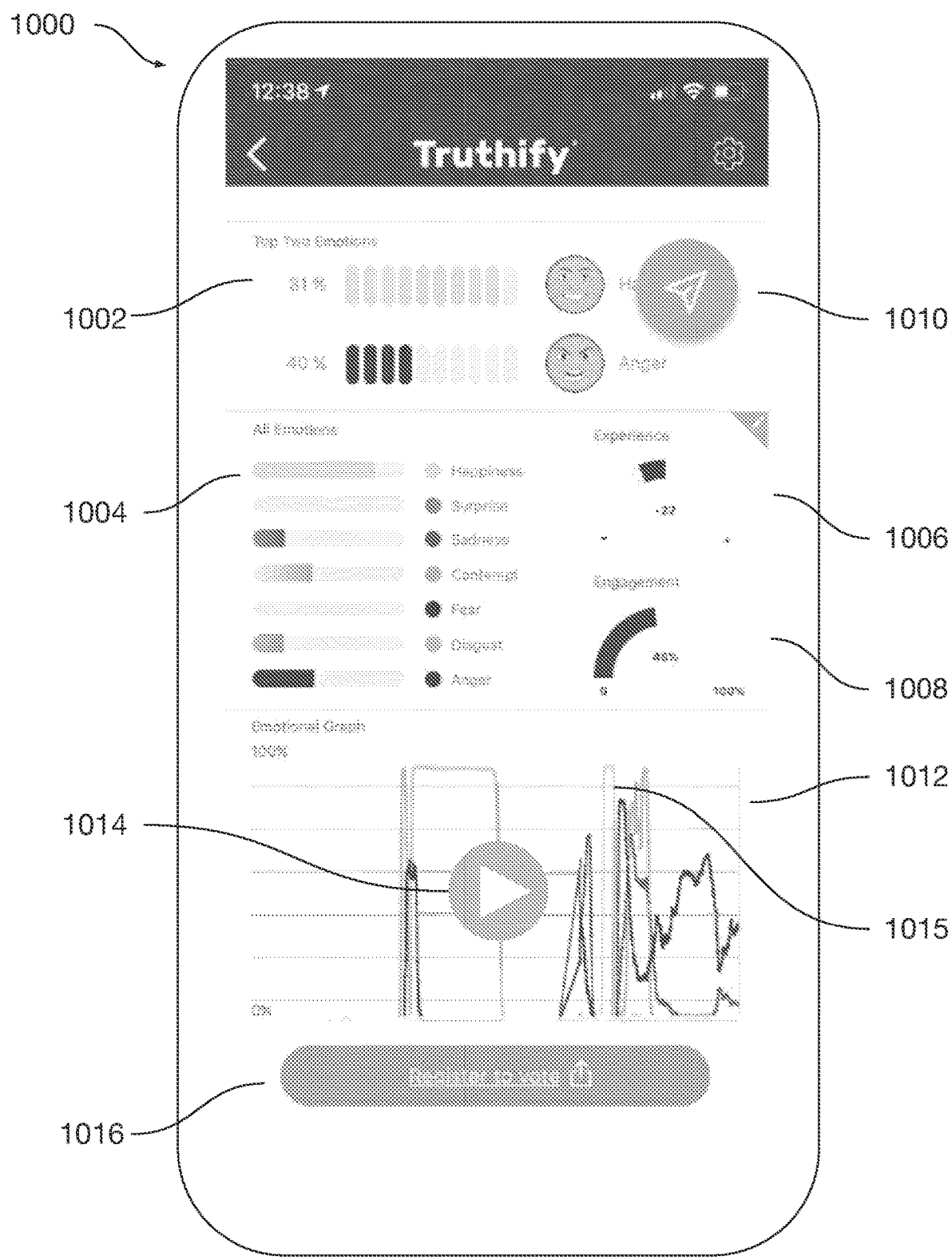
FIG. 10 shows an example user information display screen displayed in some embodiments of the present invention.

FIG. 10 depicts an example screen 1000 of a user device 108 that may be shown after the user 106 has finished viewing a campaign. The top two emotions determined by the system are shown with a confidence indicator that the emotion was conveyed in a first area of the screen 1002. The confidence indicator may be expressed (e.g., by emotion evaluation software executed on the user device 108) as a percentage and may range from 0 to 100%. In one example, the confidence indicator represents the top two emotions. In another example, the confidence indicator represents the average emotion throughout the campaign (e.g., the area under the confidence indicator vs. time curve). The information at 1002 may be termed an "emotion index" for the user 106, and in this case will be an individual emotion index.

A second area 1004 displays multiple emotions determined by the system with a confidence indicator for each emotion. In one example, the confidence indicator represents the likelihood that each emotion was detected during the campaign. In another example, the confidence indicator represents the average emotion throughout the campaign (e.g., the area under the likelihood vs. time curve).

At 1006, a measure of the experience is shown, whereby experience indicates whether the average emotion that was determined is positive or negative. For example, positive emotions might include happiness and surprise, while negative emotions might include sadness, anger, disgust, contempt, and fear. In 1008, a measure of engagement is shown, whereby in this example engagement is a measure of how much time, as a percentage, it was determined that the user 106 was displaying an emotional reaction while watching the campaign. A measure of engagement greater than 15%, for example, may be considered a very good result and may be interpreted to mean the campaign production creative content or topic was done well.

A sharing button 1010 is shown on the screen 1000 to allow the user 106 to share the video with other users via another application (e.g., SMS, email, Facebook, Instagram, etc.) installed on the user device 108. A graph 1012 of the confidence indicator of the emotions is plotted as a function of time for the length of a campaign for several emotions. The graph includes multiple emotions detected by the system. For example, the seven emotions shown in the second area 1004 may be shown in the graph 1012. The emotions may be color coded or otherwise shown to distinguish the emotions corresponding to the curves on the graph 1012.

Figure 11:
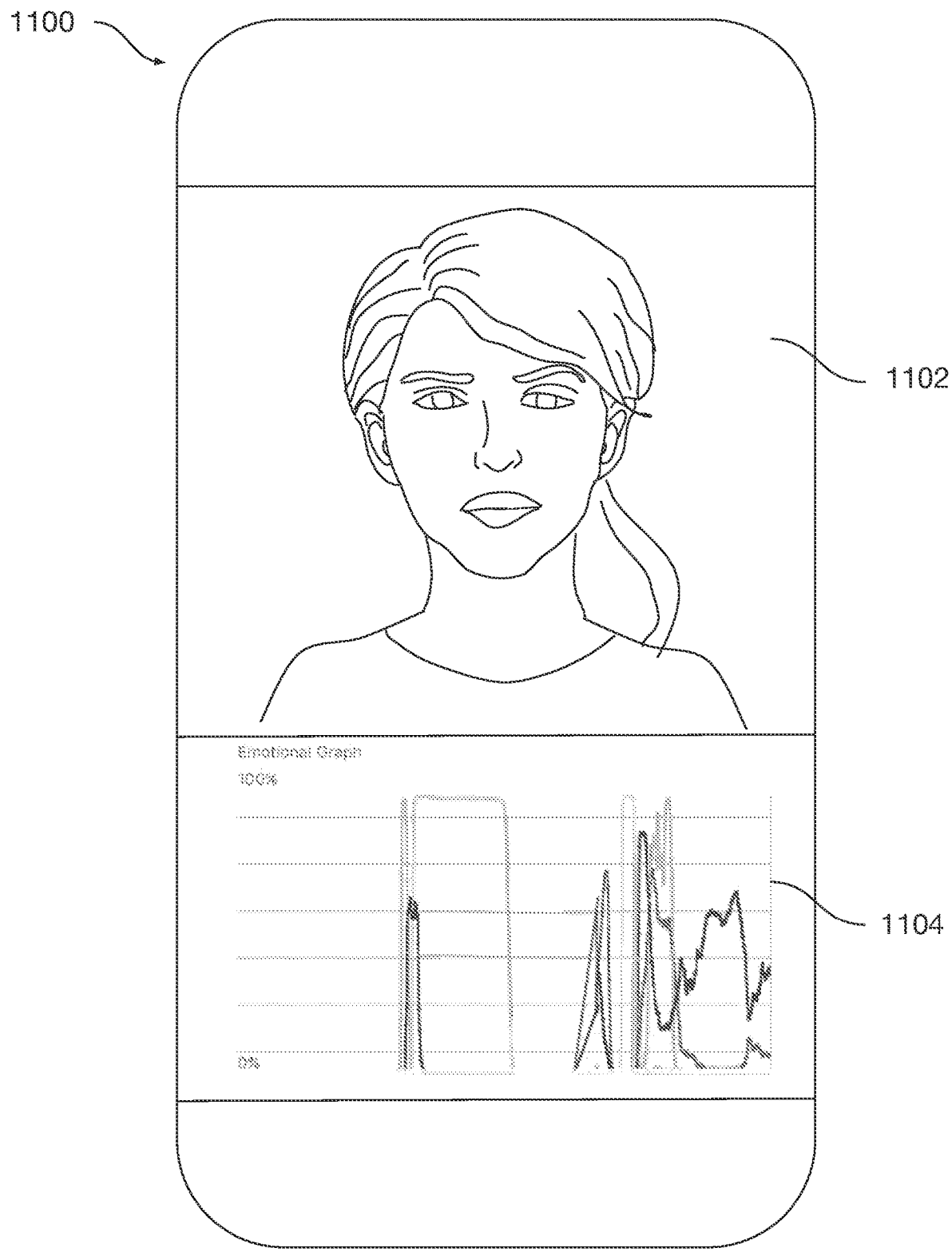
FIG. 11 shows an example user video playback screen displayed in some embodiments of the present invention.

A play button 1014 is shown on the screen as an overlay over the graph 1012 to allow the user 106 to play back the campaign and observe when the user's emotions are detected (as a function of time) during the campaign. FIG. 11 depicts an example screen 1100 of a user device 108 that may be shown as a result of the user 106 selecting the play button 1014 in FIG. 10. In this example, the campaign 1102 is played on the screen simultaneously as the graph of the confidence indicator of the emotions 1104 is displayed as a function of time. This enables the user 106 to observe at what moment the user 106 shows the emotions while viewing the campaign. In this example, the user 106 can play/pause/forward/rewind to review the campaign and associated emotions.

As described above, markers may be placed at certain parts of a presentation, so that the user's reaction to the presentation is evaluated at these points by the system and the user 106 is presented with suggested follow-on actions based on the emotional reaction of the user 106 that is identified by the system. For example, in FIG. 10, the section of the video denoted at 1015 may be deemed "Marker Location A," and the system may provide suggested follow-on actions for the user 106 as detailed in this chart:

| Marker Location | Identified Emotion | Suggested Follow-On Action |
| --- | --- | --- |
| A | Happiness | Register to vote |
| A | Disgust | Informative Web site |
| A | Contempt | Email to representative |

An action button 1016 is shown on the screen 1000 to prompt the user 106 to select an additional action. For example, the action button 1016 shown in FIG. 10 indicates "Register to vote" and may provide a link to a voting website or application. In one embodiment, the proposed action is determined by the client, and different actions may be presented based on the emotion and/or confidence indicator of the emotion of the user 106 that was determined during the viewing of the campaign.

A variety of follow-on actions for the user 106 may be presented by systems and methods of the invention. The user 106 may be presented with, for example, an opportunity to register or sign up for a program, an opportunity to register to vote, an opportunity to send a message via a messaging platform or via email, a link to a point-of-sale website (which may be a deep link to a particular product), or the user 106 may be taken to a page containing information about a topic.

A metric called the emotion index, which may be either an individual emotion index or a composite emotion index, has been developed to classify one or more users 106 who view a campaign or presentation. The individual emotion index is a measure of a viewer's emotional response to a campaign and the composite emotion index is a measure of a group of users' emotional response to a campaign. Some examples of the basis for computing the emotion index include: (i) the strongest emotion shown for a single individual during the campaign; (ii) the strongest average emotion shown for a given group of individuals; (iii) the average emotion shown over time for a single individual; and (iv) the average emotion displayed over time for a given group of individuals.

When emotion index information is provided for a single person, (whether at a single time or over a period of time) that may be termed an "individual emotion index." When a summary emotion index is aggregated for multiple individuals (either at a specific time or over a period of time), that may be termed a "composite emotion index."

Figures 14A, 14B:
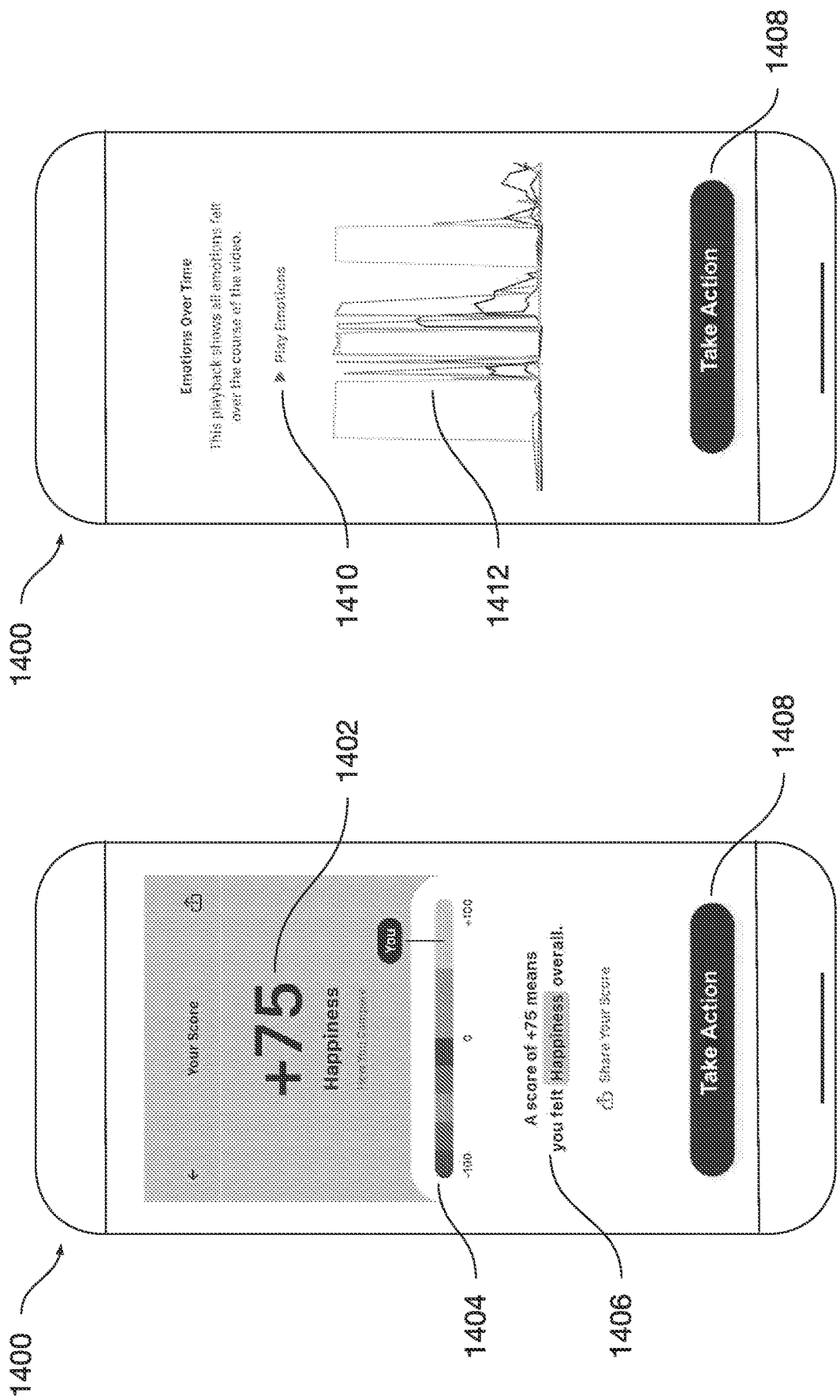
FIGS. 14a-14d show example user summary screens displayed in some embodiments of the present invention.

In one embodiment, the individual emotion index is provided as one number at any specific period of time or over a range of time, and will be from −100 to +100 (as shown in FIG. 14*a*, below), with different numbers in that range corresponding to different emotions. In one embodiment, these emotions are as listed at the measure 1004 in FIG. 10

The emotion index may incorporate the following: an emotional state analysis such as, for example, the measures 1002 and 1004 shown in FIG. 10; a measure of experience such as, for example, the measure 1006 shown in FIG. 10; and a measure of engagement such as, for example, the measure 1008 shown in FIG. 10.

The emotional state analysis may comprise several emotional measures including, for example, (i) a primary, secondary, tertiary, etc. emotion of a user 106, and (ii) an average emotional state of the user 106. Other measures are possible. In one example, the user's average emotion may be determined by integrating the confidence indicator of the emotion as a function of time. This may be done for all of the detected emotions, and the emotions may be ordered (e.g., primary, secondary, tertiary, etc.) based on the determined values. The average emotional state of the user 106 may be determined by averaging over all of the determined emotions.

The measure of engagement may comprise a measure of how much time, as a percentage, it was determined that the user 106 was displaying an emotional reaction while watching a campaign. A measure of engagement greater than 15%, for example, may be considered a very good result and may be interpreted to mean the campaign production creative content or topic was done well.

The measure of experience may comprise a measure of the average emotion that was determined to be either positive or negative. For example, positive emotions might include happiness and surprise, while negative emotions might include sadness, anger, disgust, contempt, and fear.

Systems according to some embodiments of the present invention enable the dynamic playback of emotional state analysis results concurrent with campaign and intelligent annotations, wherein intelligent annotations highlight key elements of a campaign that correspond to emotional responses by the user 106. For example, intelligent annotations may show via text what was said or displayed via video or still images during the presentation. For example, if a celebrity was shown during the presentation, a smart annotation might read "Picture of [Celebrity's Name] appears on screen." With reference to the example method 500 of a user viewing phase, at block 520, the emotional state analysis results are displayed on the user device 108 for the user 106 to view. This occurs after the user has finished viewing a campaign and allows the user 106 to quickly see how he/she reacted while viewing the campaign. As will be discussed below, the ability of a user 106 to see how he/she reacted to the campaign increases the user's engagement in follow-on activity.

Referring to FIG. 11, in one example, annotations (such as, for example, text, screenshots, figures, etc.) may be displayed during the campaign playback when the confidence indicator of an emotion exceeds a threshold value. In one example, the annotations are displayed as an overlay image in proximity to the emotional response graph on the screen when the confidence indicator of the emotion exceeds a threshold value. In another example, the annotations are displayed instead of the campaign during the time when the confidence indicator of the emotion exceeds a threshold value. In yet another example, only the annotations are displayed (i.e., the campaign is not displayed) on the screen simultaneously as the graph of the confidence indicator of the emotions is displayed as a function of time.

In one example, an "annotation mode" may be selected by the user 106. The annotation mode may be configured to provide annotations when a primary or dominant emotion is determined. The threshold value may be defined by the system, and/or may be configured by the user 106 as part of the annotation mode. In one example, text annotations are selected from a transcription of the campaign audio. The transcription may be done prior to running the campaign, or it may be done dynamically during times when the system detects a very clear expression of emotion by the user 106 (that is, during times when the system determines a high confidence indicator for an emotion).

Figure 12:
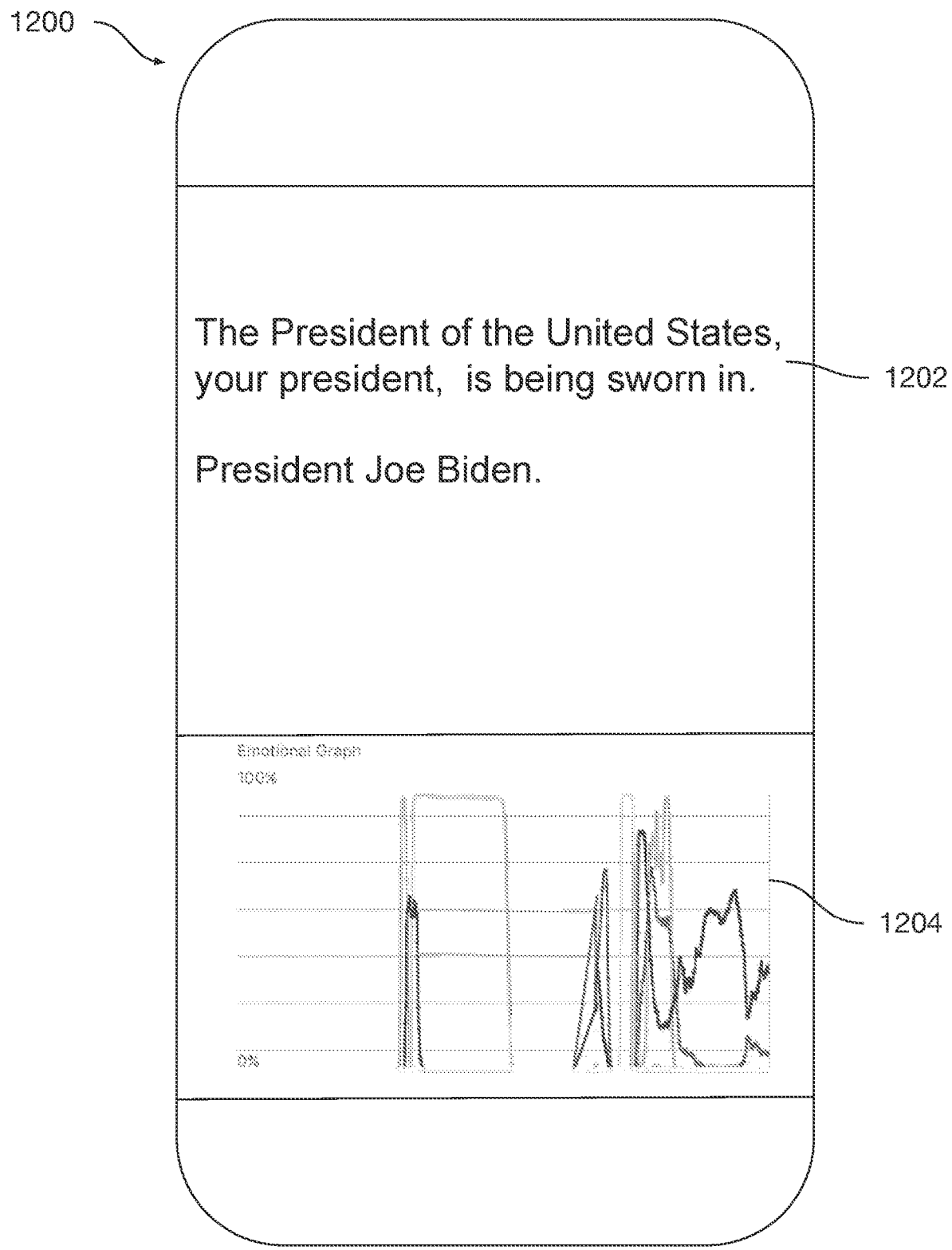
FIG. 12 shows an example user information display screen illustrating the user's emotional reaction as displayed in some embodiments of the present invention.

FIG. 12 depicts an example screen 1200 of a user device 108 that displays text of what was said or displayed via video or still images that were prominent in the campaign during times where the confidence indicator of an emotion was great. In one example, the text is automatically transcribed from the campaign audio. The transcription may be done prior to running the campaign, or it may be done dynamically during times when the confidence indicator was great. In an example, the text 1202 is displayed as an image during a point where the confidence indicator of an emotion is high as can be seen in the graph of the emotions 1204. In one example, the text is overlaid over the campaign video. In another example, the text and/or image is displayed instead of the campaign video for a portion of time. In one example, the text is automatically generated during playback periods when the confidence indicator is high to emphasize the audio content corresponding to the corresponding emotion.

Figure 13:
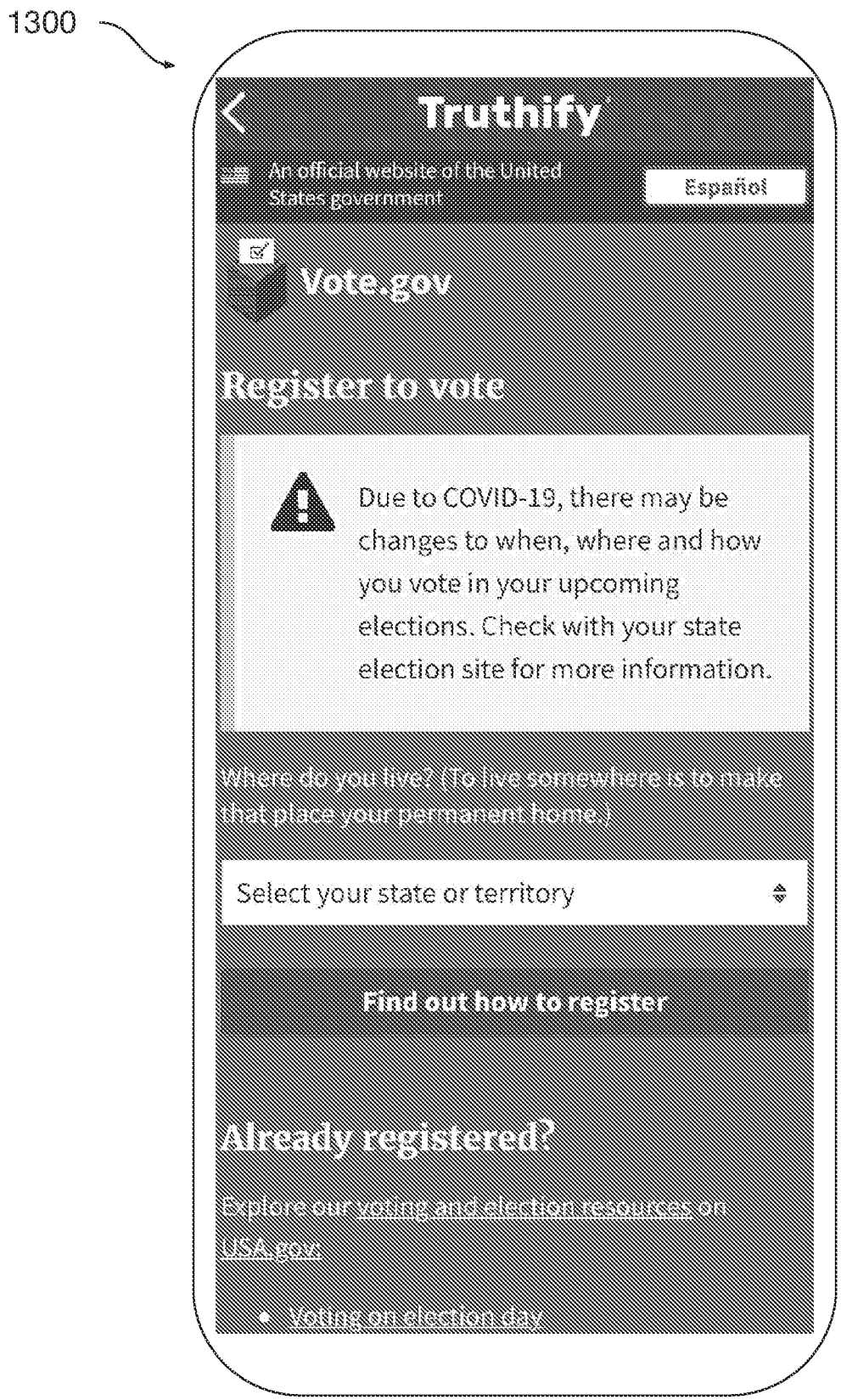
FIG. 13 shows an example screen allowing a user to take a follow-on action as displayed in some embodiments of the present invention.

FIG. 13 depicts an example screen 1300 of a user device 108 that may be shown as a result of the user 106 selecting the "Register to vote" action button 1016 in FIG. 10 is shown. The ability to suggest or prompt an action when a user 106 can see how they felt about something may generate user attention, and the click-rate can be relatively high in these circumstances. As displayed on the screen 1300, the suggestion or prompt to take the action may be dynamically changed to reflect recent developments in the news, so that the action is more likely to be effective.

A user 106 may want more detail about the system's determination of the user's emotional reaction (which may be expressed as an emotion index) in response to viewing a campaign. FIGS. 14a-14d show how this information may be conveyed to the user 106.

FIG. 14a depicts a user summary screen 1400 of a user device 108 that may show the user 106 statistics for their campaign viewing. For example, the individual emotion index 1402 (in this case, +75, indicative of happiness), graphical display of the individual emotion index 1404, emotion index description 1406, and "take action" button 1408 are shown.

In some embodiments of the present invention, the concept of experience indicates whether the average emotion that was determined, individually or in aggregate, is positive or negative. For example, positive emotions might include happiness and surprise, while negative emotions might include sadness, anger, disgust, contempt, and fear.

FIG. 14b shows another view of the user summary screen 1400, in which a user 106 may be given the opportunity to play back the system's determination of the emotions expressed by the user 106 using the "play emotions" button 1410. Graph 1412 shows the emotions displayed over the duration of the campaign, plotted as a function of the confidence indicator displayed over time. The "take action" button 1408 appropriate to the user's emotion index may be displayed across all screens showing the user's emotional reaction to the campaign.

Figure 14D:
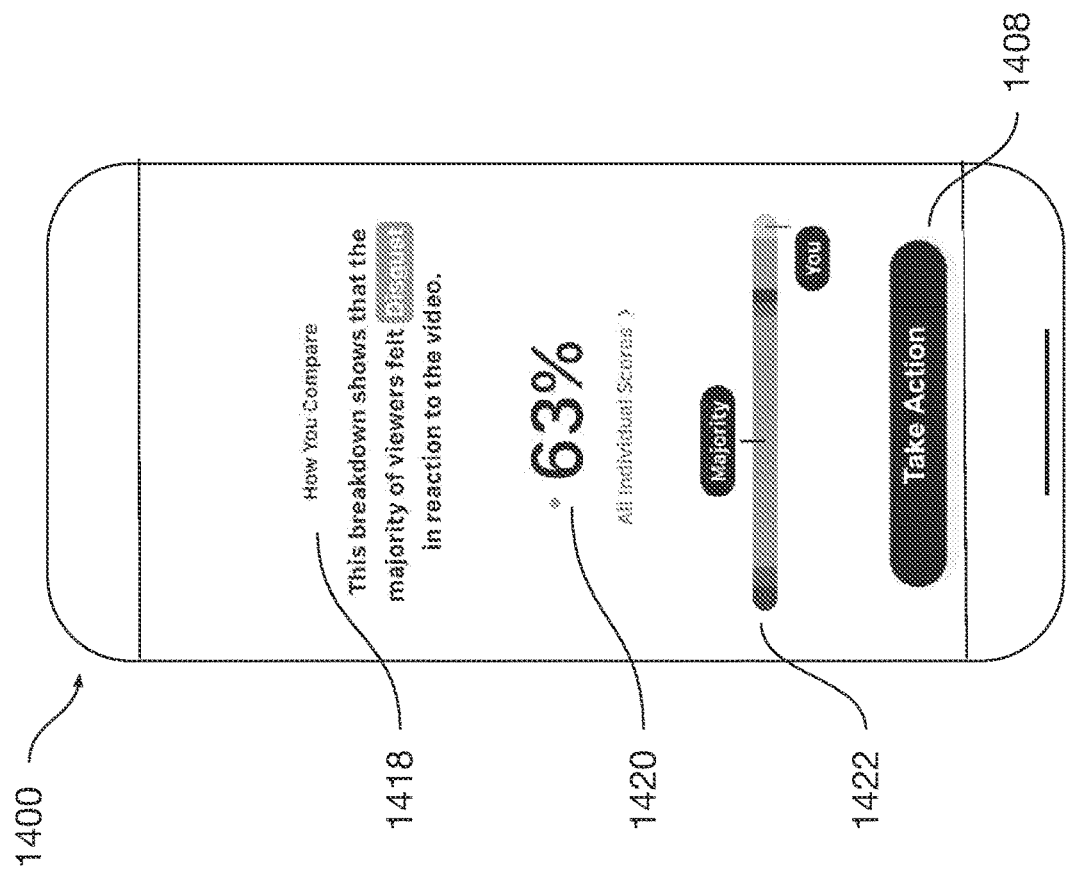
Figure 14C:
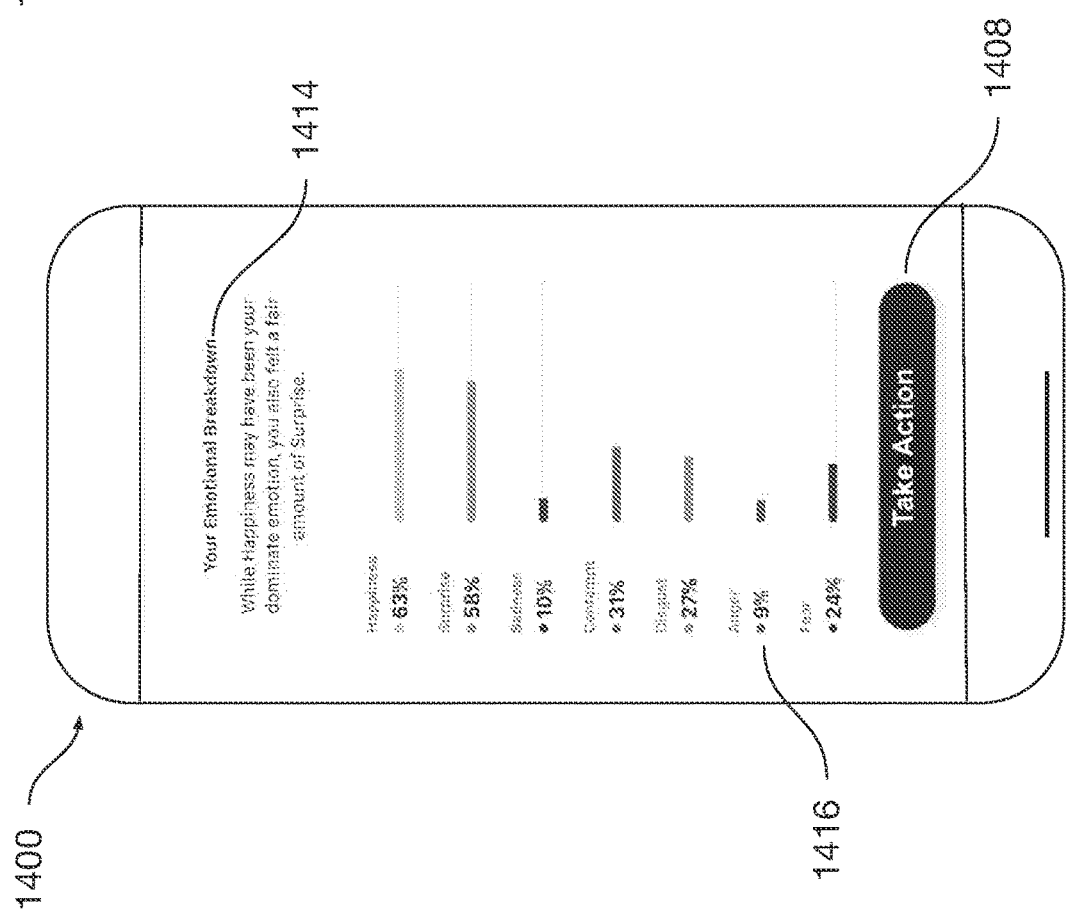

FIG. 14c shows another view of the user summary screen 1400, in which an "emotional breakdown" description 1414 is shown. Graphs 1416 are shown indicating the system's confidence indicator that each of a selection of emotions was shown during the user's viewing of the campaign.

FIG. 14d shows another view of the user 106 summary screen 1400, in which a comparison summary 1418 is shown summarizing how the user's emotion index compared to other users' emotion index in reaction to the campaign. A percentage indicator 1420 shows the percentage of users that reacted to the campaign by showing the most common emotion conveyed by users (in this case, disgust), along with the percentage of users who conveyed the most common emotion (in this case, 63%). A comparison graph 1422 shows the user's emotion index within a statistical display of all users' emotion index, highlighting the emotion conveyed by the majority of users (again, disgust in this case).

Referring again to FIG. 5, at block 522, a determination is made if the user 106 is to be compensated for viewing the campaign. At block 524, the user-specific information is sent to the client (i.e., campaign organizer) and the user 106 is compensated. It is important to note that both of these operations may be done immediately after the user 106 completes viewing the video campaign. At block 526, no compensation is provided to the user 106 and only anonymous data is sent to the client (i.e., campaign organizer).

According to an example implementation, the client campaign results of the disclosed process may be accessed via a first client device 104. The client may use the client device 104 to interface a software application (e.g., stand-alone application, web-based application, etc.) that may run on the client device 104, be hosted on a remote server 110, or a combination of both. Referring to FIG. 4a, the active campaigns 404 are shown on the home screen 400. In this example, a client may select a particular campaign from the active campaigns 404 to get more information about the campaign.

Figure 15:
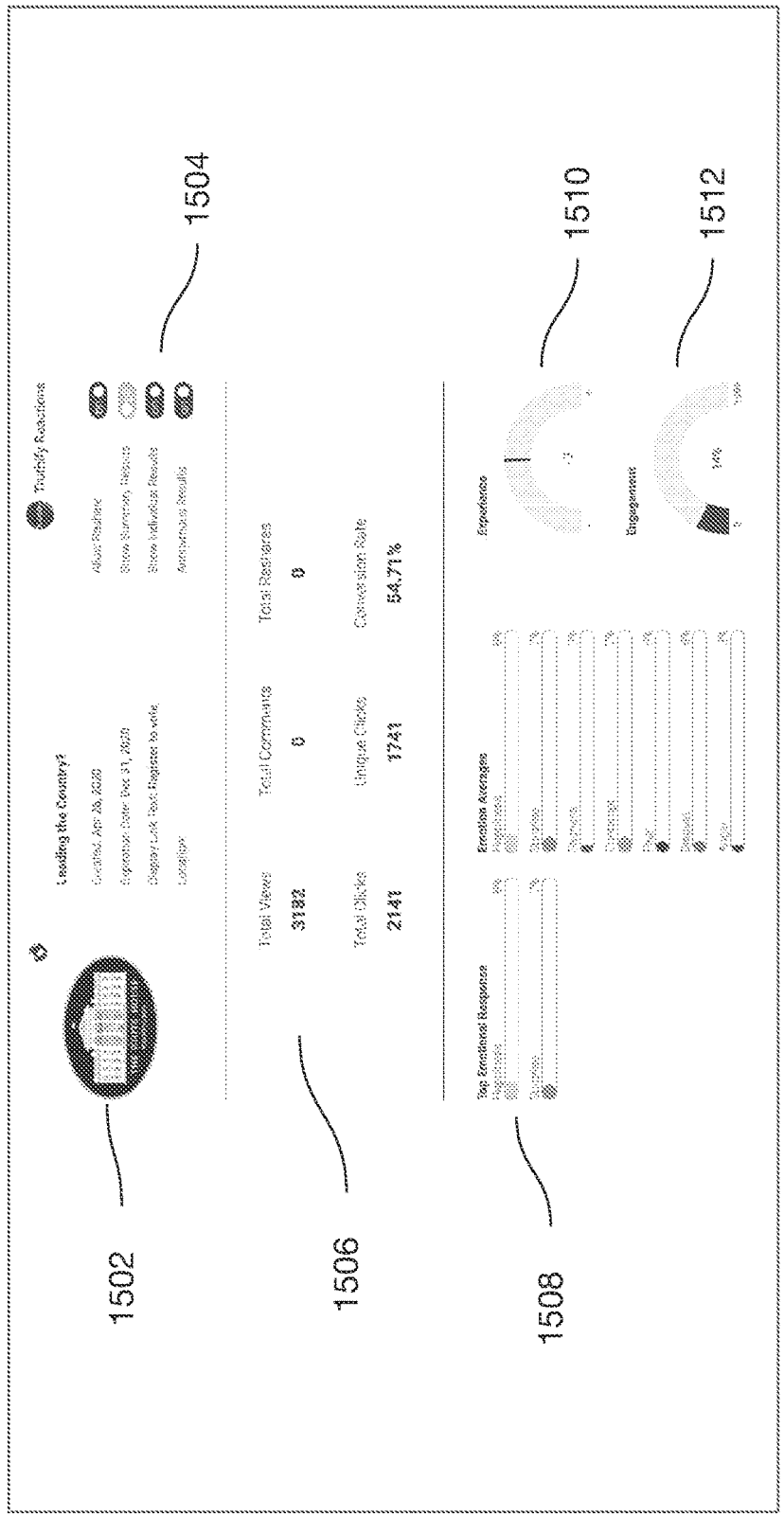
FIG. 15 shows an example campaign information screen that may be displayed to a client in some embodiments of the present invention.

FIGS. 15-19 show screen images of an application that can assist a client 102 in understanding the outcome of a deployed campaign. FIG. 15 depicts an example screen 1500 for a web-based application that may be shown on a client device 104 and provides summarized results of the campaign. In this example, campaign information and settings are shown in area 1502, some campaign information display settings can be modified using the interface at 1504, viewing information is shown in area 1506, emotional response information is shown at 1508, experience information is shown at 1510, and engagement information is shown in 1512. In this example, the results are anonymized, and they provide a quick view of the performance of the campaign.

Figure 16A:
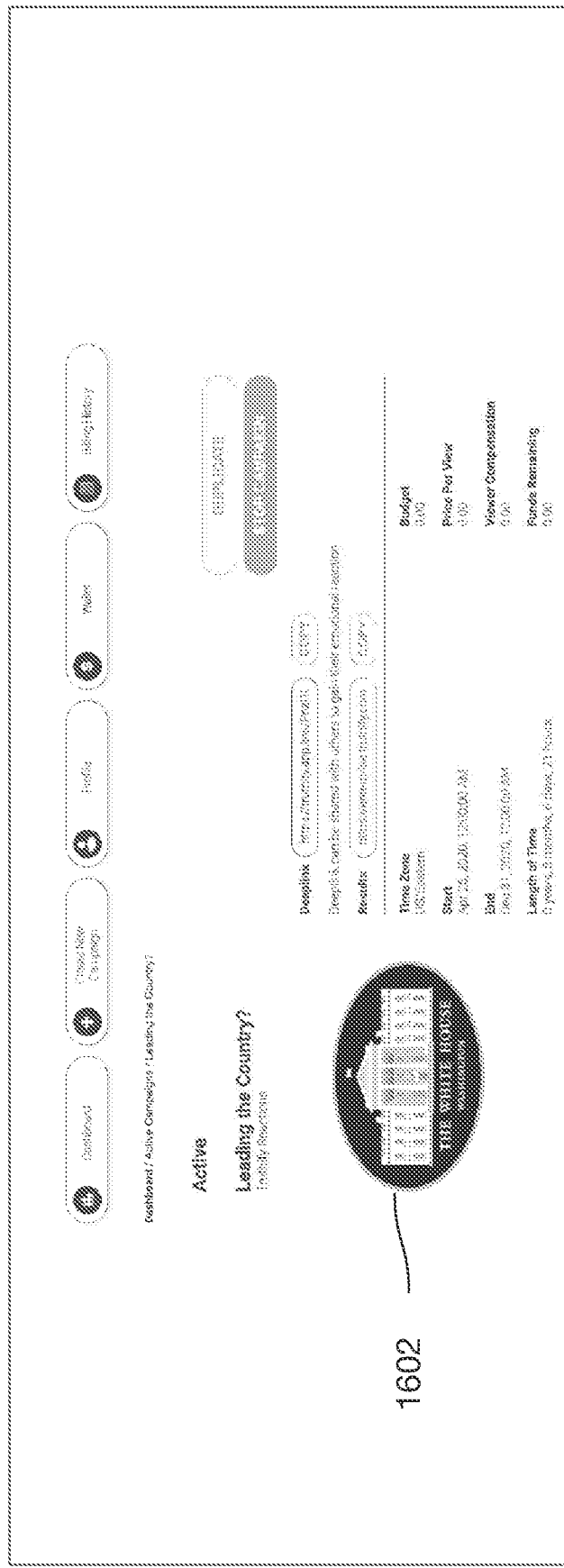
FIGS. 16a-16b show example campaign information screens that may be displayed to a client in some embodiments of the present invention.
Figure 16B:
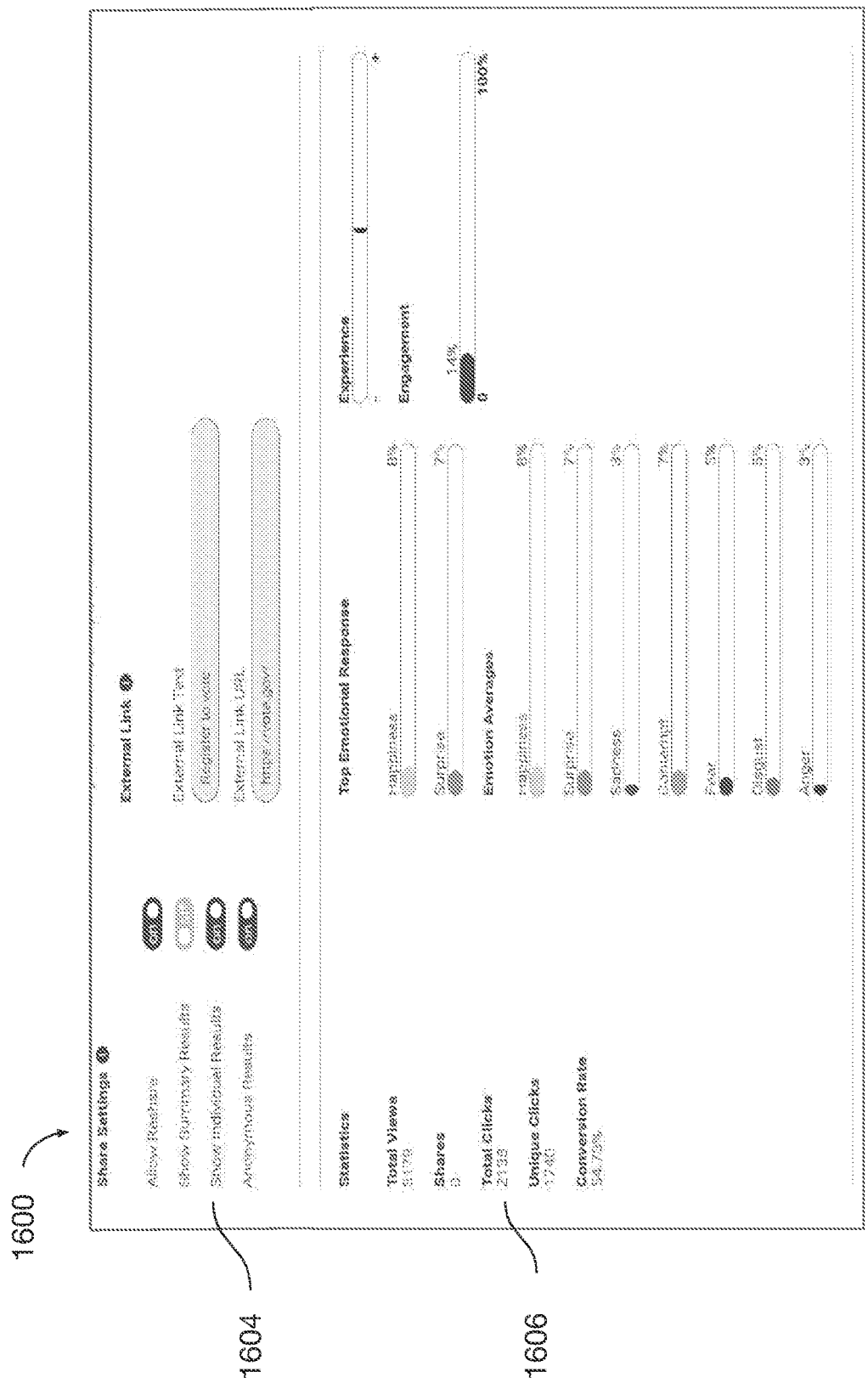

FIGS. 16a-b depict an example screen 1600 for a web-based application that may be shown on a client device 104 as a result of the client selecting a campaign from the list of active campaigns 404. Note that in this example, FIGS. 16a-b represent a continuous web page that can be scrolled up and down to reveal additional information. Other implementations are possible. In this example, campaign information and information display settings are shown in areas 1602 and 1604, and statistics about the campaign can be found in 1606. In this example, the information setting area 1604 shows the information display settings selected. The basic emotion statistic area 1606 shows basic information about emotions conveyed by users, along with information on clicks (total clicks, unique clicks, and a conversion rate) on a campaign link. This information may be updated dynamically and in real-time as it may correspond to a live campaign.

Figure 17:
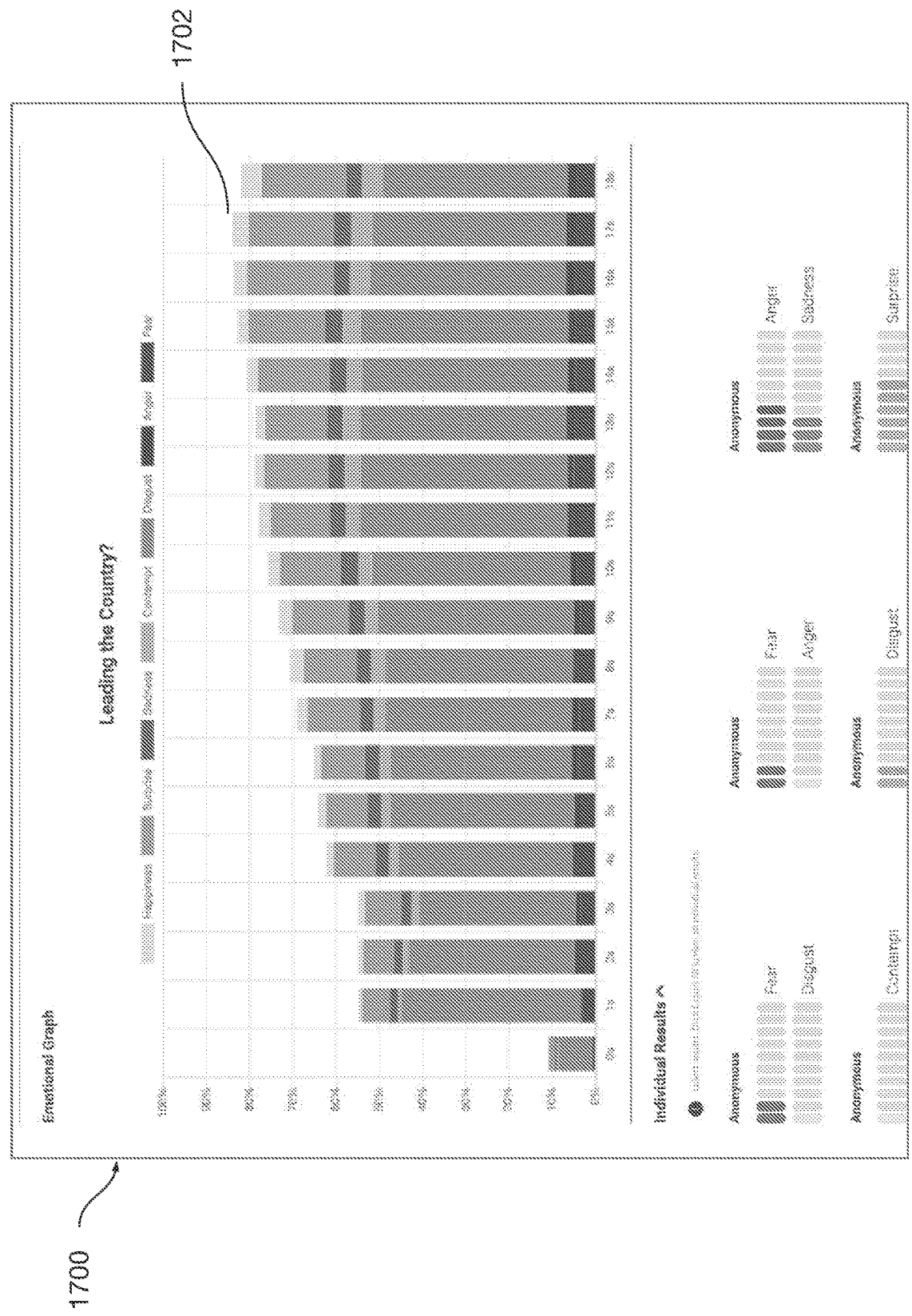
FIG. 17 shows an example emotional graph screen that may be displayed in some embodiments of the present invention.

FIG. 17 depicts an example emotional graph screen 1700 for a web-based application that may be shown on a client device 104 that shows an emotional graph for the campaign results. In this embodiment, the emotions for the users are stacked to help the client identify the most significant results. In another embodiment the results for all users' emotions are aggregated and shown as a function of time for the campaign.

For example, in FIG. 17, the emotional graph screen 1700 shows that the greatest point of user engagement in the video was at the 17 second mark, as shown by bar 1702. At this point, approximately 84% of users were conveying some emotion, with the most common emotion being disgust and the second most common emotion being surprise.

Figure 18:
FIG. 18 shows an example individual results screen that may be displayed in some embodiments of the present invention.

FIG. 18 depicts an example individual results screen 1800 for a web-based application that may be shown on a client device 104 that shows the emotions detected for individuals. In some embodiments, the results are shown for a subset of all of the users (e.g., last seven users). In some embodiments, the shown results are anonymous. In one embodiment, the shown results are anonymous unless the campaign is a compensated campaign.

Figure 19:
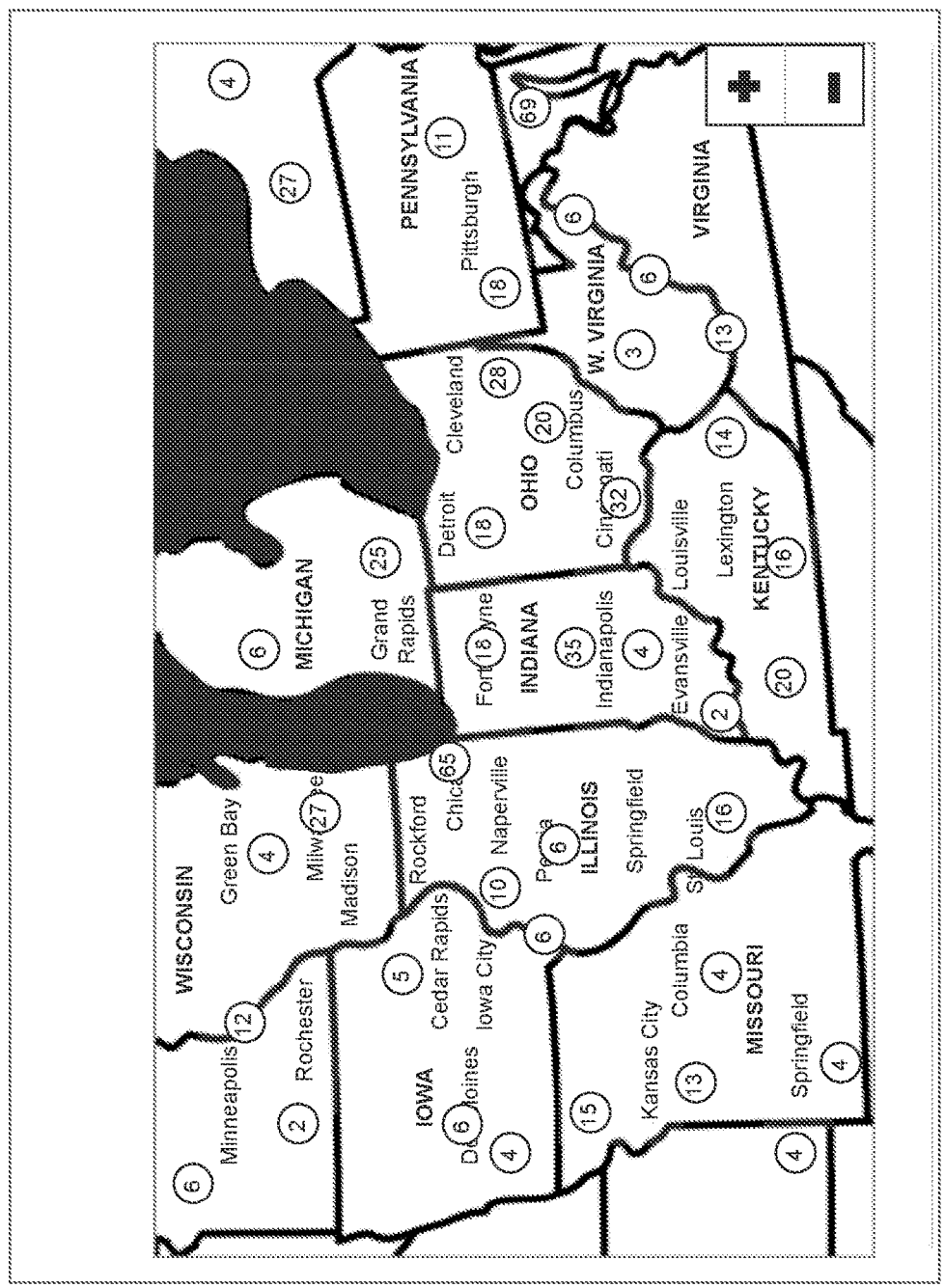
FIG. 19 shows an example location information screen that may be displayed in some embodiments of the present invention.

FIG. 19 depicts an example location information screen 1900 for a web-based application that may be shown on a client device 104 that shows the location of the users who viewed the campaign.

Figure 20:
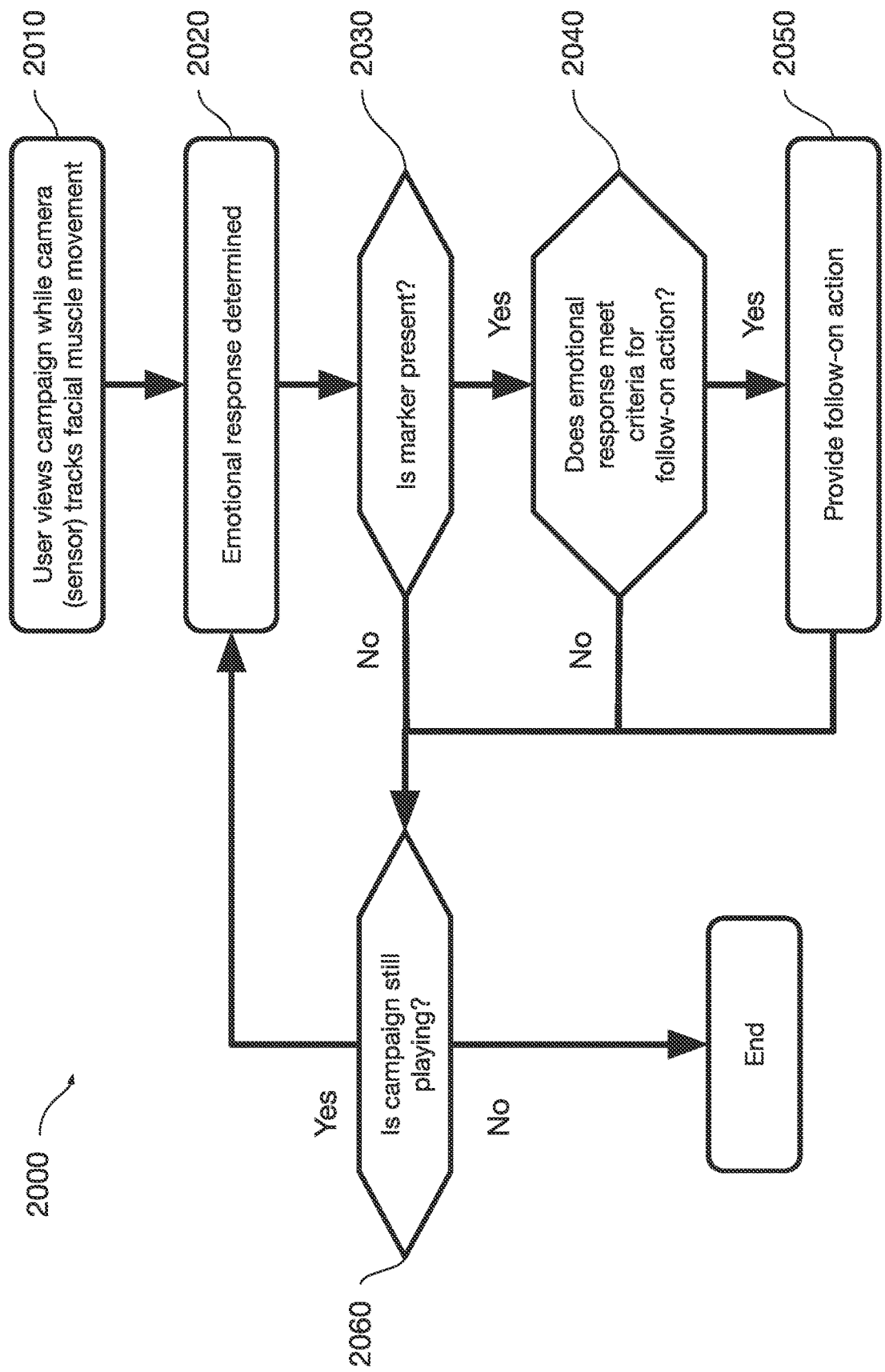
FIG. 20 shows a flow chart for a user viewing phase employed in some embodiments of the present invention.

In some embodiments, the present invention can dynamically provide campaign follow-on actions using results of an automated emotional analysis. FIG. 20 depicts an example method 2000 of a user viewing phase that can be implemented within an operating environment including or involving, for example, the system 100 of FIG. 1. The method 2000 may include one or more operations, functions, or actions as illustrated by one or more blocks.

According to an example implementation, the user viewing phase of the disclosed process may begin with a first user 106 accessing the disclosed campaign tool via a first user device 108 (see FIG. 1). The user 106 may use the user device 108 to interface a software application (e.g., stand-alone application, embedded application, web-based application, etc.) that may run on the user device 108, be hosted on a remote server 110, or a combination of both.

In block 2010, one or more sensors used as monitoring hardware (e.g., camera, microphone, etc.) on the user device 108 are activated, and the campaign is initiated. In one example, the camera is activated, and the user 106 positions their face such that it is framed within the screen. The camera is used to capture and track the facial expressions and/or muscle movements of the user 106 while they are watching the campaign.

In block 2020, an emotional response is determined for the user 106 viewing the campaign. This block is similar to block 516 in FIG. 5. In one example the emotional response includes the determination of one or more emotions and the corresponding confidence indicator(s) (e.g., confidence level(s)) of the one or more emotions. In another example, the emotional response included the determination of one or more emotions and the running average of the corresponding confidence indicator of the one or more emotions.

In block 2030, an optional step is shown to determine if a marker is present in the campaign. In some embodiments, a client assigns (i) one or more markers corresponding to one or more time locations in the campaign, (ii) one or more desired emotions corresponding to the one or more markers, and (iii) one or more follow-on actions corresponding to the one or more emotions that are assigned to the one or more markers. In this embodiment, markers correspond to a point of time in the presentation where a decision is being made by the system to determine what action or actions to present to the user.

When a marker is identified during the viewing of a campaign, the system determines which particular emotion the user is exhibiting (and in some cases the confidence indicator of the emotion), and based on the determined emotion and/or the confidence indicator of the emotion, one or more of the related follow-on actions are presented. For example, if the system determined that a user 106 demonstrated a "surprise" emotion when a product was revealed in a campaign at a marker, then the system might direct the user 106 to a point of sale (POS) site to purchase the product. On the other hand, if the system determined that a user 106 demonstrated a "disgust" emotion when a product was revealed in a campaign at a marker, then the system might direct the user 106 to sign up for a mailing list.

In block 2040, the system compares the emotional response determined in block 2020 with (e.g., pre-established) criteria to determine if a follow-on action will be provided. In one example, the comparison is triggered by the presence of a marker in the campaign. In another example, the comparison is triggered by the emotional response exceeding a threshold or meeting some other criteria.

If a marker is determined to be present during the viewing of a campaign (as depicted in block 2030), the system compares the emotional response determined in block 2020 with the one or more emotions assigned by the client to the marker.

In another embodiment, if a marker is not present, but the emotional response determined by the system exceeds a threshold (or some other criteria is met), then the system compares the emotional response with criteria assigned by the client. Thus, follow-on actions may be presented to users 106 even if markers are not provided by the client 102. In such a scenario, with reference to FIG. 20, the decision block 2030 would be skipped and the system would proceed to decision block 2040 to evaluate whether to provide the user 106 with a follow-on action as shown at block 2050.

The follow-on action may be provided when the criteria is met during the campaign and/or it may be provided after the campaign is completed. In one example, the follow-on action may be an action that prompts the user 106 to provide input. For example, if the emotional response was determined to be "surprise" and/or the confidence indicator of the surprise emotional response is greater than a threshold when a product was revealed in a campaign at a marker, then the system might provide a link on the screen to direct the user 106 to a point of sale (POS) site to purchase the product. In another example, if the emotional response of a user 106 is determined to be disgust and/or the disgust emotional response is greater than a threshold at any time throughout the campaign, then a comment window is opened to allow the user 106 to provide feedback on the campaign. As shown in block 2060, if the campaign stops playing, the process is ended.

Figure 21:
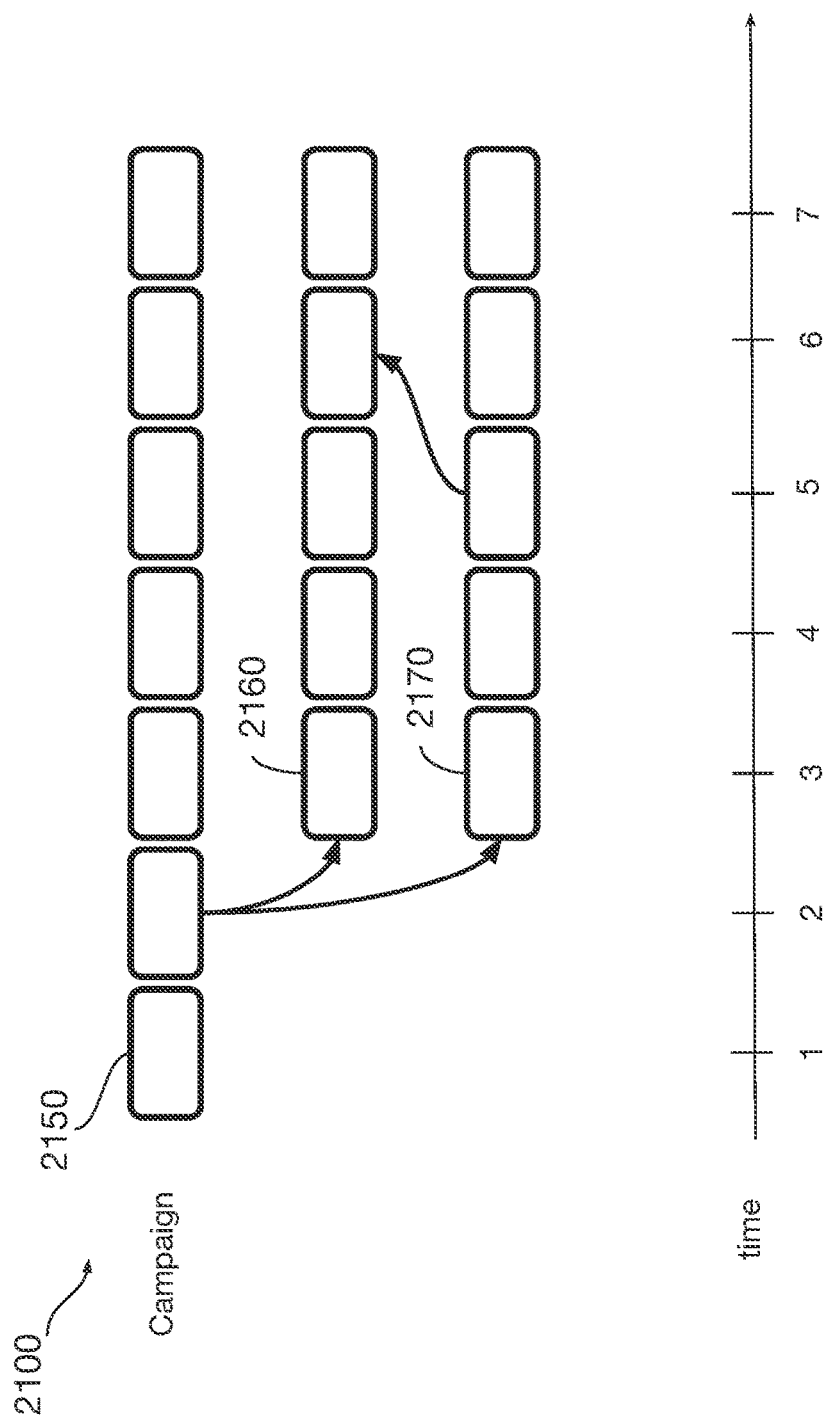
FIG. 21 shows an example campaign variation display employed in some embodiments of the present invention.

In another example, the follow-on action may be an action taken by the campaign itself. For example, a campaign may dynamically stitch together several segments depending on the user's emotional response that is detected. FIG. 21 depicts an example of a campaign variation display 2100 in which a campaign is divided into several time segments that are stitched together depending on the determined emotional response. The original campaign 2150 is divided into seven segments that will be played in order if no emotional response criteria is met. At time 2, if a first criteria is met (e.g., "happiness" is detected and/or the confidence indicator of the happiness emotional response is greater than a threshold), then the campaign switches to the segments 2160. If instead a second criteria is met (e.g., "anger" is detected and/or the confidence indicator of the anger emotional response is greater than a threshold), then the campaign switches to segments 2170. At time 5, if a third criteria is met (e.g., "happiness" is detected and/or the confidence indicator of the happiness emotional response is greater than a threshold), then the campaign switches to segments 2160.

Figure 22:
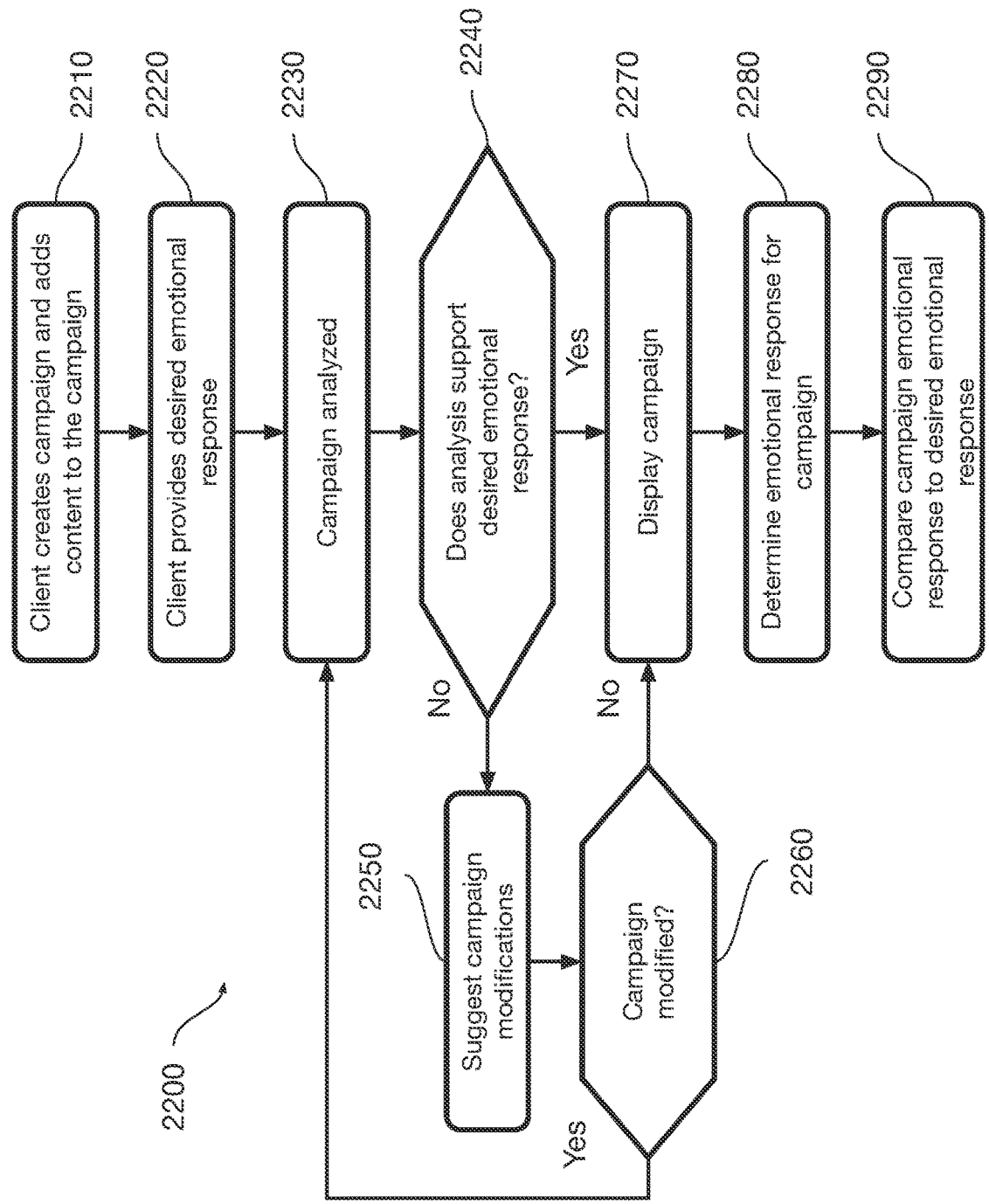
FIG. 22 shows a flow chart for client campaign authoring phase used in some embodiments of the present invention.

Some embodiments of the present invention enable dynamic determination and manipulation of a campaign using a desired emotional response. In some examples, the client may determine a desired emotional response for a campaign. For example, the campaign may be designed to elicit a particular emotion (e.g., happiness, sadness, anger, joy, etc.) or an emotional response journey throughout the campaign. FIG. 22 depicts an example method 2200 of a client campaign authoring phase and client campaign results phase when a desired emotional response is provided. The client campaign authoring and results phases can be implemented within an operating environment including or involving, for example, the system 100 of FIG. 1.

According to an example implementation, the client campaign authoring phase of the disclosed process may begin with a first client accessing the campaign authoring tool via a first client device 104. The client may use the client device 104 to interface a software application (e.g., stand-alone application, web-based application, etc.) that may run on the client device 104, be hosted on a remote server 110, or a combination of both.

In block 2210, the client creates a new campaign using the software application on the client device 104. For example, the client may use the example home screen 400 of FIG. 4a to create a new campaign by selecting the "Create New Campaign" software button 402 to initiate the process. In response to the client selecting the Create New Campaign button 402, the client device 104 may present a view of the campaign authoring tool that enables the client to add content and to customize the campaign.

At block 2220, in response to the client creating a new campaign, the client device 104 presents a view of the campaign authoring tool that enables the client to provide a desired emotional response for the campaign.

In one example, the desired emotional response may be a single response selected for the campaign. For example, a list of emotions (e.g., happiness/joy, sadness, anger, contempt, fear, disgust, surprise, etc.) may be presented to the client so that the client may select one of the emotions as the desired emotional response for the campaign. As illustrative non-limiting examples, the desired emotional response may correspond to the average emotional response for the campaign, the final (i.e., last) emotional response determined for the campaign, or the emotional response that had the largest confidence indicator in the campaign.

In another example, the desired emotional response may correspond to only a portion of the campaign and/or may be time-based such that the emotional response may correspond to a particular time in the campaign. For example, the client may choose an emotional response for a 30 second campaign that starts with "sadness", shifts to "surprise" after 10 seconds, and then ends with "happiness" for the final 10 seconds. In this example, the selection of a desired time-based emotional response may involve a combination of selecting a time interval and a corresponding emotion. It can also be seen that such an emotional response as a function of time can be represented as a graph. In one example, the client may select an emotion and assign the emotion to one or more time periods for a campaign. In another example, the client may select a preferred emotional response from a first (e.g., previous) campaign as the desired emotional response for a second campaign. In one example, the desired emotional response may be an "envelope function" of the emotional response curves determined for the first campaign such that the emotional response with the greatest confidence indicator for a particular time period is selected as the desired emotion for that time period. Other examples exist.

At block 2230, the system automatically analyzes the uploaded campaign material for characteristics that may not be consistent with the desired emotional response. For example, if the campaign is desired to provide a positive emotional response, then an analysis of the campaign may trigger several suggestions to change the campaign to provide a better chance of a positive emotional response. In some examples, the analysis of the campaign may involve identifying certain characteristics of the campaign, referencing a database mapping such characteristics to emotional responses, and determining a projected emotion based on such information. For example, a narrator wearing a green shirt generally elicits a happier emotional response than a narrator wearing a red shirt. If the analysis of the campaign identifies a narrator wearing a red shirt during a time when the desired emotional response for the campaign is happiness, the system may identify that portion of the campaign is not consistent with the desired emotional response.

At block 2240, the system determines if the uploaded campaign material is consistent with the desired emotional response. If the campaign material is not consistent with the desired emotional response, the system moves to block 2250. If the campaign is consistent with the desired emotional response, the system moves to block 2270. At block 2250, the system automatically provides suggested campaign modifications to the client. The modifications may be provided to the client in message form (e.g., email, direct message, etc.) and may include the suggested campaign modifications.

At block 2260, the client may modify the campaign and upload the modified campaign to be analyzed again.

At block 2270, the campaign exits the campaign authoring phase and is released for viewing by users 106.

Once the users 106 begin viewing the campaign, the system enters the campaign results phase. At block 2280, the system determines the emotional response for the campaign. The emotional response may be dynamically determined as users 106 watch the campaign. The results may be provided to the client on a per-user basis and/or as an aggregated result.

At block 2290, the emotional response for the campaign is compared with the desired emotional response of the campaign. If the emotional response for the campaign is determined to be aligned (e.g., within a confidence interval) with the desired emotional response, then the campaign is considered to be successful. However, if the emotional response of the campaign results are not aligned with the desired emotional response, then a notification is provided to the client. For example, if the analysis identifies sections (i.e., portions) of the campaign that are not aligned with the desired emotional response, then those sections are highlighted and raised to the client. Additionally, suggestions for the misaligned sections may be proposed to the client.

Systems and methods of the current invention may be used with a variety of different types of functions. For example, the current invention may be used in a dating system, whereby a user 106 may be presented with videos showing a variety of people representing potential dating matches for the user 106. After evaluating the user's emotional reaction to potential matches, the system can present the user 106 with an option to, for example, message the potential match if the user's emotional response is positive. If the user's emotional response is not positive, such an option may not be presented, and the user 106 may be shown a video of another potential match. In one embodiment, depending on the user's emotional response, either similar or different matches may be presented. For example, if the user 106 has a positive response to videos of potential matches exhibiting a specific trait, more potential matches exhibiting that trait may be presented to the user 106.

It is to be noted that facial expressions and/or muscle movements are used by systems and methods of various embodiments of the present invention as indicators of user emotions, and that these and other indicia of user emotions may be used either in combination or independently to determine a user's expressed emotion, to calculate emotion indices, or to calculate confidence indicators.

The above description refers to block diagrams and other accompanying drawings. Alternative implementations of the example represented by the block diagram may include one or more additional or alternative elements, processes and/or devices. Additionally or alternatively, one or more of the example blocks of the diagrams may be combined, divided, re-arranged or omitted. Components represented by blocks of the diagrams may be implemented by hardware, software, firmware, and/or any combination of hardware, software and/or firmware. In some examples, at least one of the components carrying out the functions described in the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

The above description refers to various operations described herein and flowcharts that may be appended hereto to illustrate the flow of those operations. Although the blocks are illustrated in sequential order, the actions indicated by the blocks may in some embodiments be performed in parallel, and/or in a different order than those described herein. Also, the various blocks may be combined into fewer blocks, divided into additional blocks, and/or removed based upon the desired implementation. Also, the various blocks may be combined into fewer blocks, divided into additional blocks, and/or removed based upon the desired implementation. Any such flowcharts are representative of example methods disclosed herein. In some examples, the methods represented by the flowcharts may be implemented by the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a machine-readable medium) for execution by logic circuit(s).

As used herein, each of the terms "machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Applications described as "web-based applications" may also be executed within specific pieces of hardware, with data communication with other pieces of hardware occurring as needed.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments, examples, or implementations should not be interpreted as mutually exclusive, and should instead be understood as potentially combinable if such combinations are permissive in any way. In other words, any feature disclosed in any of the aforementioned embodiments, examples, or implementations may be included in any of the other aforementioned embodiments, examples, or implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. Items described as connected may or may not be connected directly or mechanically. A device or structure that is "configured" in a certain way is configured in at least that way, but may also be configured in ways that are not listed. The term "link" may be used to refer to a deep link that takes the user 106 to particular content.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method for informing a user about the emotional response of the user to a presentation, the method comprising:
   presenting to the user an audio-video presentation via an application on a device having a user interface;
   monitoring facial expressions of the user while presenting the presentation;
   analyzing the facial expressions of the user to determine a first emotion conveyed by the facial expressions of the user, wherein the first emotion is measured to be the strongest emotion conveyed at a specific time in the presentation;
   correlating the facial expressions of the user conveying the first emotion to one or more portions of the presentation;
   presenting to the user information about the first emotion conveyed by the facial expressions of the user along with information about the one or more portions of the presentation that correspond to the correlated facial expressions of the user conveying the first emotion, wherein presenting said information about said first emotion conveyed includes displaying at least one of a graph, chart, picture, or list of emotions, in which the first emotion is emphasized to indicate it is measured to be the strongest emotion;
   providing a plurality of action options mapped in a multi-dimensional array as a function of both specific emotional responses and specific time markers within the video presentation;
   selecting from the multi-dimensional array a suggested action that corresponds to the first emotion and the specific time and is responsive to content presented in the presentation; and
   providing the user with an opportunity to take the suggested action using the user interface via the application in conjunction with presenting information about the first emotion conveyed.

2. The method of claim 1, wherein presenting to the user information about the first emotion conveyed comprises presenting the user with a text summary of the first emotion conveyed and a color coded graph depicting a measure of emotions detected as a function of time.

3. The method of claim 2 wherein information about the one or more portions of the presentation that correspond to the correlated facial expressions of the user conveying the first emotion comprises a text transcription of the audio within the presentation.

4. The method of claim 1 wherein the presentation is a slide show.

5. The method of claim 4 wherein information about the one or more portions of the presentation that correspond to the correlated facial expressions of the user conveying the first emotion comprises a display of text or images of the slide show.

6. A system for informing a user about the emotional response of the user to a presentation, the system comprising:
   presentation hardware comprising a display and an audio output for presenting to the user an audio/video presentation via an application;
   a user interface;
   monitoring hardware for monitoring facial expressions of the user while presenting the presentation;
   a multi-dimensional array mapping a plurality of action options as a function of both specific emotional responses and specific time markers within the video presentation;
   a processor connected to the monitoring hardware and adapted to analyze the facial expressions of the user to determine a first emotion conveyed by the facial expressions of the user, wherein the first emotion is measured to be the strongest emotion displayed at a specific time in the presentation;
   said processor further adapted to correlate the facial expressions of the user conveying the first emotion to one or more portions of the presentation;
   said presentation hardware further being adapted to present to the user information about the first emotion conveyed by the facial expressions of the user along with information about the one or more portions of the presentation that correspond to the correlated facial expressions of the user conveying the first emotion, responsive to commands from said processor, wherein presenting said information about said first emotion conveyed includes displaying at least one of a graph, chart, picture, or list of emotions, in which the first emotion is emphasized to indicate it is measured to be the strongest emotion;
   said processor further selecting from the multi-dimensional array a suggested action that corresponds to the first emotion and is responsive to content presented in the presentation and providing the user with an opportunity to take the suggested action using the user interface via the application in conjunction with the presentation by said presentation hardware of said information about the first emotion conveyed.

7. The system of claim 6, wherein said information about the first emotion conveyed comprises a text summary of the first emotion conveyed and a color coded graph depicting a measure of emotions detected as a function of time.

8. The system of claim 6 wherein information about the one or more portions of the presentation that correspond to the correlated facial expressions of the user conveying the first emotion comprises a text transcription of the audio within the presentation.

9. The system of claim 6 wherein the presentation is a slide show.

10. The system of claim 9 wherein information about the one or more portions of the presentation that correspond to the correlated facial expressions of the user conveying the first emotion comprises a display of text or images of the slide show.

11. The system of claim 6 wherein the presentation hardware comprises a touchscreen and providing the user with the opportunity to take the suggested action comprises presenting the suggested action to the user as a software button on the touchscreen.

* * * * *